(12) United States Patent
Medard et al.

(10) Patent No.: US 8,812,671 B2
(45) Date of Patent: *Aug. 19, 2014

(54) ARRANGEMENTS AND METHODS FOR ACCESS TO STORED DATA

(71) Applicant: Juniper Networks, Inc., Sunnyvale, CA (US)

(72) Inventors: Muriel Medard, Belmont, MA (US); Mark Aikens, Hudson, MA (US); Louis M. Colon, Jr., Bolton, MA (US); James M. Hurley, Boxborough, MA (US); Michael Kilian, Harvard, MA (US); Matthew McShane, Upton, MA (US); Michael Warres, Arlington, MA (US); Robert W. Scheifler, Somerville, MA (US)

(73) Assignee: Juniper Networks, Inc., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/727,400

(22) Filed: Dec. 26, 2012

(65) Prior Publication Data

US 2013/0117450 A1 May 9, 2013

Related U.S. Application Data

(63) Continuation of application No. 12/827,154, filed on Jun. 30, 2010, now Pat. No. 8,352,602.

(60) Provisional application No. 61/222,167, filed on Jul. 1, 2009, provisional application No. 61/227,832, filed on Jul. 23, 2009.

(51) Int. Cl.
*G06F 15/173* (2006.01)
*H04L 29/08* (2006.01)

(52) U.S. Cl.
USPC ........... 709/225; 709/203; 709/206; 709/207; 709/213; 709/216; 725/98; 725/100; 725/110; 725/92; 725/93

(58) Field of Classification Search
USPC ......... 709/225, 232, 234, 204, 206, 207, 213, 709/203, 216, 245, 223, 217
See application file for complete search history.

(56) References Cited

U.S. PATENT DOCUMENTS

| | | | |
|---|---|---|---|
| 6,353,878 B1 | 3/2002 | Dunham | |
| 7,647,277 B1* | 1/2010 | Blumenfeld et al. | 705/54 |
| 7,668,871 B1 | 2/2010 | Cai et al. | |
| 7,934,083 B2* | 4/2011 | Taylor et al. | 713/1 |
| 8,064,583 B1 | 11/2011 | Sutaria et al. | |
| 8,135,687 B2* | 3/2012 | Barchi et al. | 707/694 |
| 8,239,898 B2* | 8/2012 | Rahman | 725/87 |
| 8,296,320 B1* | 10/2012 | Corbett et al. | 707/781 |
| 8,352,602 B2 | 1/2013 | Medard et al. | |
| 8,555,312 B2* | 10/2013 | Rahman | 725/39 |
| 8,584,181 B2* | 11/2013 | Rahman | 725/87 |
| 2008/0046727 A1* | 2/2008 | Kanekar et al. | 713/168 |
| 2008/0320060 A1 | 12/2008 | Hardman et al. | |
| 2009/0248804 A1 | 10/2009 | Ohtani | |
| 2010/0037256 A1* | 2/2010 | Rahman | 725/38 |
| 2010/0082655 A1 | 4/2010 | Silberstein et al. | |
| 2010/0093397 A1 | 4/2010 | Jung et al. | |
| 2010/0151825 A1 | 6/2010 | Millet Sancho | |

* cited by examiner

*Primary Examiner* — Jude Jean Gilles
(74) *Attorney, Agent, or Firm* — Harrity & Harrity, LLP

(57) ABSTRACT

An access server generates a handshake with storage servers resulting in more rapid access to the stored data, for example, video data, by a user. The handshake also results in load balancing effects.

20 Claims, 21 Drawing Sheets

ARRANGEMENTS AND METHODS FOR ACCESS TO STORED DATA

CROSS REFERENCE TO RELATED APPLICATIONS

This application is a continuation of U.S. patent application Ser. No. 12/827,154, filed on Jun. 30, 2010 (now U.S. Pat. No. 8,352,602), which claims the benefit under 35 U.S.C. §119(e) of U.S. Provisional Application No. 61/222,167 filed Jul. 1, 2009 and also U.S. Provisional Application No. 61/227,832 filed Jul. 23, 2009, the disclosures of which are incorporated herein by reference in their entirety.

FIELD OF THE INVENTION

This invention relates generally to access servers and storage servers coupled in networks and, more particularly, to access server and storage server handshake arrangements that provide a faster retrieval of stored data.

BACKGROUND OF THE INVENTION

Various network arrangements for access to stored data are known. With the advent of video data and video data accessed by users on the Internet, access speed has received increased attention.

It would be desirable to provide a storage arrangement that can result in more rapid access to stored data, for example, video data, by a user.

SUMMARY OF THE INVENTION

The present invention provides a storage arrangement that results in more rapid access to stored data, for example, video data, by a user.

In accordance with one aspect of the present invention, a storage arrangement includes a first access server configured to communicate on the network with a plurality of storage servers, and further configured to transmit a request associated with selected stored data to the plurality of storage servers. At least one of the plurality of storage servers is configured to respond to the request with an offer associated with the request. The first access server is configured to evaluate the offer and configured to transmit an action command associated with the selected stored data to the at least one storage server if the evaluation meets evaluation criteria.

In accordance with another aspect of the present invention, a method of access to networked stored data includes transmitting with a first access server a request associated with selected stored data through a network to a plurality of storage servers. The method also includes receiving with the first access server at least one offer for the selected stored data from at least one of the plurality of storage servers. The method also includes evaluating the offer with the first access server and transmitting with the first access server an action command associated with the selected stored data from the at least one of the plurality of storage servers if the evaluation meets selection criteria.

In accordance with another aspect of the present invention, a computer-readable storage medium having instructions thereon for providing access to stored data includes instructions for transmitting with a first access server a request associated with selected stored data through a network to a plurality of storage servers. The computer-readable storage medium also includes instructions for receiving with the first access server at least one offer for the selected stored data from at least one of the plurality of storage servers. The computer-readable storage medium also includes instructions for evaluating the offer with the first access server and instructions for transmitting with the first access server an action command associated with the selected stored data if the evaluation meets selection criteria.

In accordance with another aspect of the present invention, a storage arrangement includes a storage server configured to communicate on a network, and further configured to receive a request associated with selected stored data, wherein the storage server is configured to respond to the request with an offer in response to and related to the request, and wherein the storage server is configured to receive an action command in response to and related to the offer and associated with the selected stored data.

In accordance with another aspect of the present invention, a method of access to stored data includes receiving with a storage server a request associated with selected stored data stored within the storage server. The method also includes transmitting with the storage server at least one offer in response to and related to the request and associated with the selected stored data. The method also includes receiving with the storage server an action command in response to and related to the offer, wherein the action command is associated with the selected stored data.

In accordance with another aspect of the present invention, a computer-readable storage medium having instructions thereon for providing stored data includes instructions for receiving with a storage server a request associated with selected stored data stored within the storage server. The computer-readable storage medium also includes instructions for transmitting with the storage server at least one offer in response to and related to the request and associated with the selected stored data. The computer-readable storage medium also includes instructions for receiving with the storage server an action command in response to and related to the offer, wherein the action command is associated with the selected stored data.

BRIEF DESCRIPTION OF THE DRAWINGS

The foregoing features of the invention, as well as the invention itself may be more fully understood from the following detailed description of the drawings, in which.

DETAILED DESCRIPTION OF THE INVENTION

Figure 1:
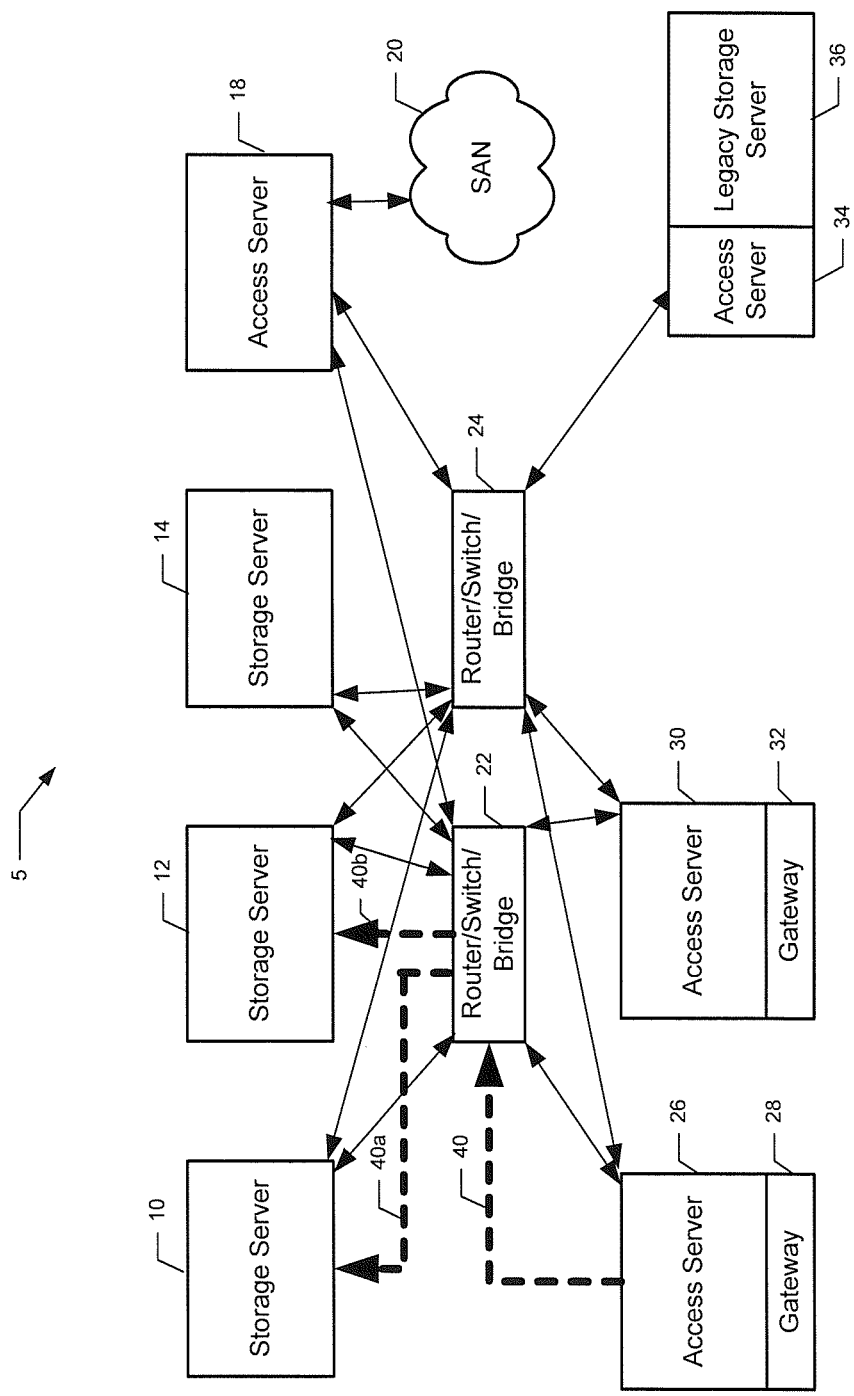
FIG. 1 is a block diagram showing an exemplary network arrangement having access servers and storage servers in which a request is made by a first one of the access servers to the storage servers.

Before describing the present invention, some introductory concepts and terminology are explained. As used herein, the term "storage area network" or "SAN" is used to describe an architecture to attach remote computer storage devices (such as disk arrays, tape libraries, and optical jukeboxes) to servers in such a way that the devices appear as locally attached to the operating system of a computer.

As used herein, the term "network attached storage" or "NAS" is used to describe a network architecture that uses file-based protocols such as NFS or SMB/CIFS, where it is clear that the storage is remote, and computers request a portion of an abstract file rather than a disk block.

As used herein, the term "video area network" or "VAN" is used to describe a read-oriented storage network architecture in which the stored data is primarily video data. In some arrangements, a VAN can be a SAN or a NAS.

As used herein, the term "delivery area network" or "DAN" is used to describe a read-oriented storage network architecture in which the stored data can be any type of data, but which is generally of a type, for example, video data or document data, which requires a large number of data bytes. In some arrangements, a DAN can be or incorporate a VAN, a SAN, or a NAS.

As used herein, the term "network" is used to describe either a physical layer comprising wires and/or fiber optic links, or a software communication layer that communicates on the physical layer. The network can be a wide area network (WAN), a local area network (LAN), a metropolitan area network (MAN), or any combination of the three. The VANS and DANs described below are shown to be arranged in LANS. However, the VANs and DANs can be arranged in a WAN, a MAN, or a LAN or in any combination of the three. It should be understood that the various servers shown in figures below are part of the networks shown below.

As used herein, the term "storage server" is used to describe a server having a storage medium directly associated therewith, for example, a plurality of storage disks or flash storage, generally upon which a relatively large amount of data, for example, video data, can be stored.

As used herein, the term "access server" is used to describe a server coupled (directly or indirectly) to one or more storage servers and accessed by a user via a personal computer or the like, wherein the access server can identify upon which one of the plurality of storage servers stored data selected by the user is stored and can access the selected data and provide the selected data to the user.

As used herein, the term "partitioning" is used to describe an arrangement in a storage server in which the storage server can maintain multiple copies of particular stored data, the number of copies determined by the storage server generally according to how often the stored data is accessed or according to how many users tend to simultaneously access the same stored data. Multiple copies can also be kept to provide fault tolerance. Partitioning can be static or dynamic.

As used herein, the terms "request," "offer," and "action command" are used to describe a three-way handshake between an access server and one or more storage servers, or between a first access server and a second access server.

As used herein, the term "object directory" is used to describe a directory kept by a storage server upon a memory within the storage server that identifies the stored data directly associated with the storage server and that indentifies where on the storage media, for example, storage disks, directly associated with the storage server each identified block or file of stored data resides. It should be recognized that, in other embodiments, one or more of the object directories could reside upon a memory within an access server.

As used herein, the term "inventory" is used to describe an inventory generally kept by an access server upon a memory within the access server that identifies upon which one or more of a plurality of storage servers identified stored data resides. The inventory generally does not identify where upon the disks of the storage server the data resides. In some arrangements, the inventory need not be kept by or within and access server, but can be kept in a memory anywhere on a network.

As used herein, the term "transcode" is used to describe a change from one format of data to another format of the same data. The change can be from one conventional format to another conventional format, from a conventional format (e.g., MPEG) to a non-conventional format (e.g., encoded "metadata"), or from an unconventional format to a conventional format. After being transcoded, in some arrangements, data at the byte level may not be the same as before being transcoded.

As used herein, the term "segmentation" is used to describe an arrangement wherein selected stored data, for example, a video movie, can be broken into parts or segments. The segments can all reside on storage media directly associated with one storage server or on respective storage media directly associated with a plurality of storage servers. In some arrangements, the selected stored data can instead be transcoded data, and broken into segments.

As used herein, the term "hand-off" is used to describe an arrangement in which a first access server requests to a second access server that the second access server perform a function requested by a user to the first access server. For example, if the first access server becomes overloaded with data accesses by users, the first access server can hand-off some of the data accesses to the second access server. However, the term hand-off as used herein can also be used to describe an arrangement in which an access for selected data from a first storage server is handed off to provide access to the selected data from a second storage server.

As used herein, the term "ingest" is used to describe a transfer of stored data from storage media directly associated with one storage server to storage media directly associated with another storage server. The term "ingest" is also be used to describe a transfer (writing) of data from outside of the system (i.e., at a client) to a storage server within the system.

While particular numbers of access servers and storage servers are shown in figures below, it should be understood that the techniques described below are applicable to any number of access servers (including one) and any number of storage servers (including one).

While access servers and storage servers are shown to be in separate computing platforms in figures below, in other embodiments, one or more access servers and one or more storage servers can be collocated within one computing platform so that one computing platform can act as both an access server and a storage server. Thus, as used here, the term "server" is most often used to describe server software regardless of the computing platform, unless otherwise specified.

A used herein, the term "network node" is used to refer to a discrete computing platform, i.e., hardware. In some embodiments, a network node can include only an access server or a storage server (unimodal network node). In other embodiments, a network node can include both an access server and a storage server (bimodal network node). In some embodiments, a network node can also include a plurality of access servers, or a plurality of storage servers, or both.

In some arrangements, the network node can be used in one DAN. However, in other arrangements, the network node can be used simultaneously in different DANs or used from time to time separately in different DANs. In some arrangements, a bimodal network node can be used bimodally, but in other arrangements, the bimodal network node can be used as a unimodal network node, as either one of an access server or a storage server.

In order to add clarity, however, in much of the text and figures that follow, one DAN is described and shown, in which network nodes are unimodal network nodes, each operating as either an access server or a storage server, but not both. From the discussion above, however, numerous other physical configurations should be apparent. It should also be appreciated that each network node can have other functions related or not related to an access server or a storage server.

Further detailed description of the invention is found in conjunction with figures below.

Referring now to FIG. 1, an exemplary network 5 includes storage servers 10, 12, 14 coupled through routers, switches, or bridges 22, 24 to each other and also to access servers 18, 26, 30. Communication couplings are indicated by solid arrows. The access server 18 is coupled to a SAN 20. The access server 18 is shown having no gateway, and can be, for example, an internal access server, that does not have a direct gateway to an external network. The network 5 forms a DAN.

The communication couplings can include at least two couplings into each one of the storage servers 10, 12, 14, and into each one of the access servers 26, 30, 18. The dual communication couplings can be representative of two network interfaces cards (NICs) at those storage servers and access servers. One communication coupling into the access server 34 is representative of one NIC.

The network 5 can also include a legacy storage server 36 coupled to the access server 34. The access server 34 can also be coupled through the routers, switches, or bridges 22, 24 to the storage serves 10, 12, 14 and to the access servers 18, 26, 30.

It should be appreciated that the legacy storage server 36 can be a pre-existing storage server. The access server 34 can be new hardware and new software, or pre-existing hardware with modified (patched) software or new software. With these arrangements, the access server 34 can service download requests generated by other access servers described more fully below.

In some alternate embodiments, the legacy storage server 34 does not have a directly associated access server (e.g., 34). Instead, the legacy storage server 34 includes modified (patched) or new software that enables the legacy storage server 36 to operate in a way similar to one of the other storage servers 10, 12, 14, providing handshake function described more fully below.

It will be understood from the above discussion that the systems and techniques described herein can function with new network nodes or with pre-existing (but modified) network nodes, with can be, for example, within SANs or NASs.

Gateways 28, 32 couple to the access servers 26, 30, respectively, and can provide data translation to other formats as required. For example, a user of a server, for example, the access server 26, can request data via the access server 26, through the gateway 28.

It should be appreciated that the selection of the routers, switches, or bridges 22, 24 is determined, in part, by the scope of the network 5. As is known, a router is a device that interconnects two or more computer networks, and selectively interchanges packets of data between them using IP addresses. As is also know, a bridge performs a function similar to a router, but most often on a more local scope. A bridge directs packets of data between two or more segments of a network according to hardware assigned MAC addresses. A bridge and switch are very much alike, a switch being a bridge with numerous ports.

Particular signals are shown in the network 5 by way of dashed lines. The signals are shown separately, but flow on the communication links. In operation, upon request by a user (i.e., a computer coupled to one of the access servers), the access server can be accessed to provide particular data (e.g., video data) stored on one of the storage servers 10, 12, 14, 36.

The access server 40 can generate a so-called "request" 40 that is distributed as requests 40a, 40b to the storage servers 10, 12, respectively. In general, any particular storage server may or may not have the requested data stored thereon. Also, even if a particular storage server does have the requested data stored thereon, the storage server may have a substantial delay time required to provide the stored requested data, for example, due to other requests for data made by other access servers or due to other functions being performed by the storage server (e.g., mass data backup or due to the fundamental latency of the storage medium itself).

In some embodiments, the request 40 is broadcast to the storage servers 10, 12 as a multicast protocol command.

The request 40 can include, but is not limited to, a data identifier, a data segment (data range) identifier value, a read request, an ingest request, an erase request, a change request, a priority value, an urgency value, and a query. The data identifier, with the data segment identifier value, identifies the specific data (e.g., specific video data) to be requested by the access server 26 in a subsequent action command described below.

The read request identifies the request as one associated with a particular type of action, a read of data, to be requested by the access server 26.

The ingest request identifies the request as one associated with a particular type of action, an ingest of data, to be requested by the access server 26. As described above, an ingest is a transfer of data, for example, from one storage server to another storage server. An ingest may be desirable, for example, when a storage server on which the requested data resides is busy servicing other requests. In this case, it may be desirable to copy or to transfer the requested data to a storage server with greater ability to service the request.

The erase request identifies the request as one associated with another particular type of action, an erasure of data, to be requested by the access server 26.

The change request will be understood from the discussion below in conjunction with a change action command.

The priority value is a value determined by the access server indicative of an urgency with which the access server 26 needs an action, e.g., the reading of data, to take place. At some times, the urgency may be low, for example, when the access server is requesting a part of future video data (e.g., a future part of a movie currently being viewed as a video stream) that will be used in the future by the user of the access server 26. The priority can also be high, for example, when the user of the access server 26 must receive the requested data (e.g., video data) in order to make the user of the access server have no interruptions in the data (e.g., an interruption in a movie). The priority value can also be anywhere in between high and low. Alternatively, data urgency can be conveyed in the priority value by an explicit deadline time value.

A query can be used in a variety of situations. The query can include, but is not limited to, an available bandwidth query (i.e., bandwidth of the storage server), a range of bandwidth query, a probability of bandwidth query, a delay of response query (i.e., delay of response of the storage server in providing the requested data), a range of delay of response query, and a probability of delay of response query.

Each one of the storage servers 10, 12, 14 can include an object directory therein. As described above, an object directory identifies the stored data directly associated with a storage server and indentifies where on the storage media, for example, storage disks, directly associated with the storage server each identified block or file of stored data resides.

Figure 2:
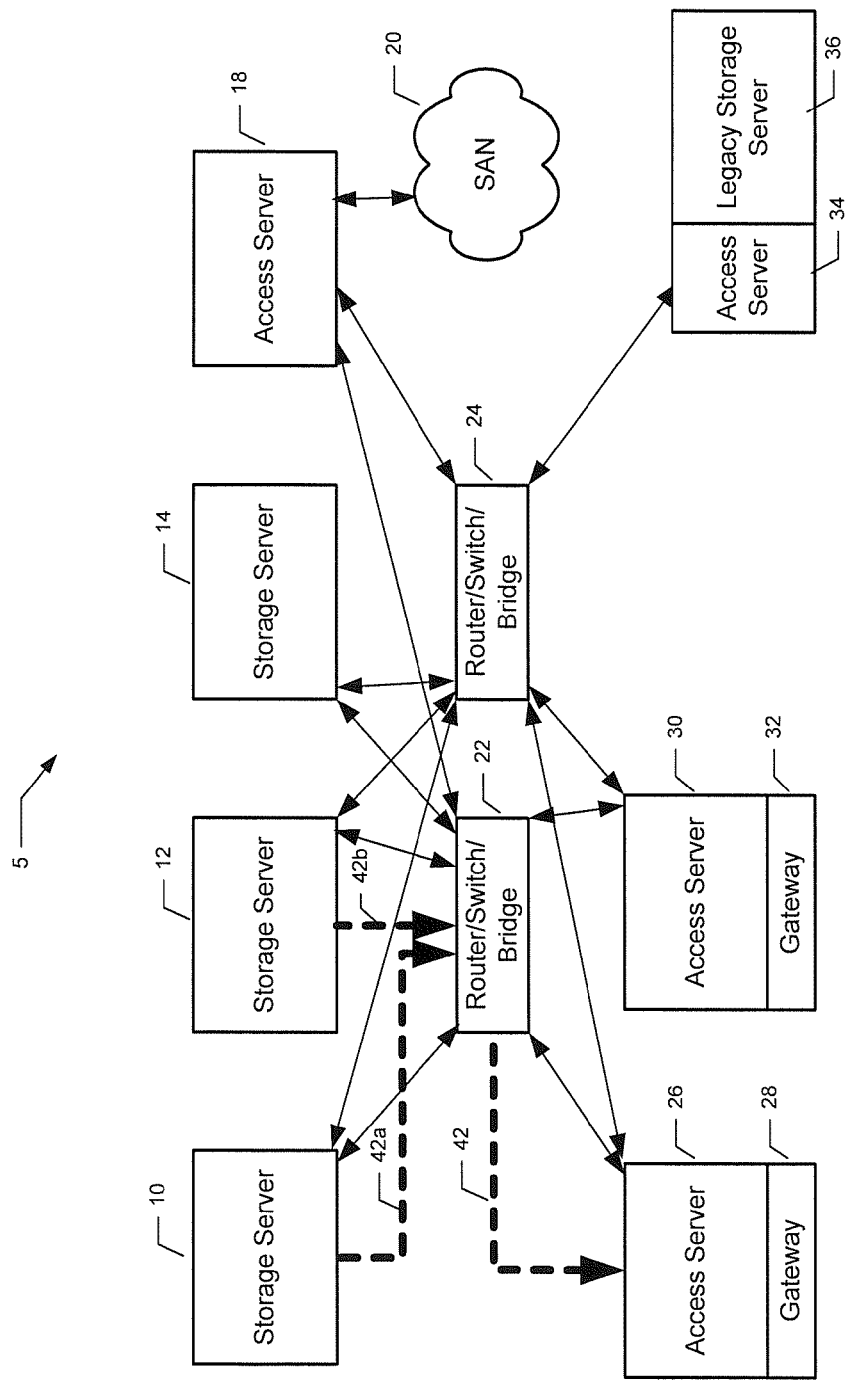
FIG. 2 is a block diagram showing the network arrangement of FIG. 1 in which the first access server receives offers from the storage servers.

Referring now to FIG. 2, in which like elements of FIG. 1 are shown having like reference designations, the storage servers 10, 12 can respond to the requests 40a, 40b of FIG. 1, with so-called "offers" 42a, 42b, which arrive as offers 42 at the access server that originated the request 40 of FIG. 1.

Each one of the offers 42a, 42b can include, but is not limited to, a respective data identifier value, a respective data availability identifier value, a respective null data identifier value, a respective data segment (data range) identifier value, a respective available bandwidth value, a respective range of bandwidth value, a respective probability of bandwidth value, a respective delay (or speed) of response value, a respective range of delay of response value, a respective probability of delay of response value, a cost value (in terms of load upon the respective storage server), or a current load value of the respective storage server.

The offers 42a, 42b can also include a respective offer "weight" value indicative of a combination of one or more of the above-listed values. In other words, the offer weight value can be a number or numbers indicative of a combination of other ones of the values. In some embodiments, the offer weight value is indicative of one or more of the delay of response value, the available bandwidth value, the cost value, or the current load value. However, other combinations of offer values are also possible to be within the offer weight value.

It will be understood that the offers 42a, 42b are indicative of an ability of the respective storage servers 10, 12 to service the requests 40a, 40b of FIG. 1.

Figure 3:
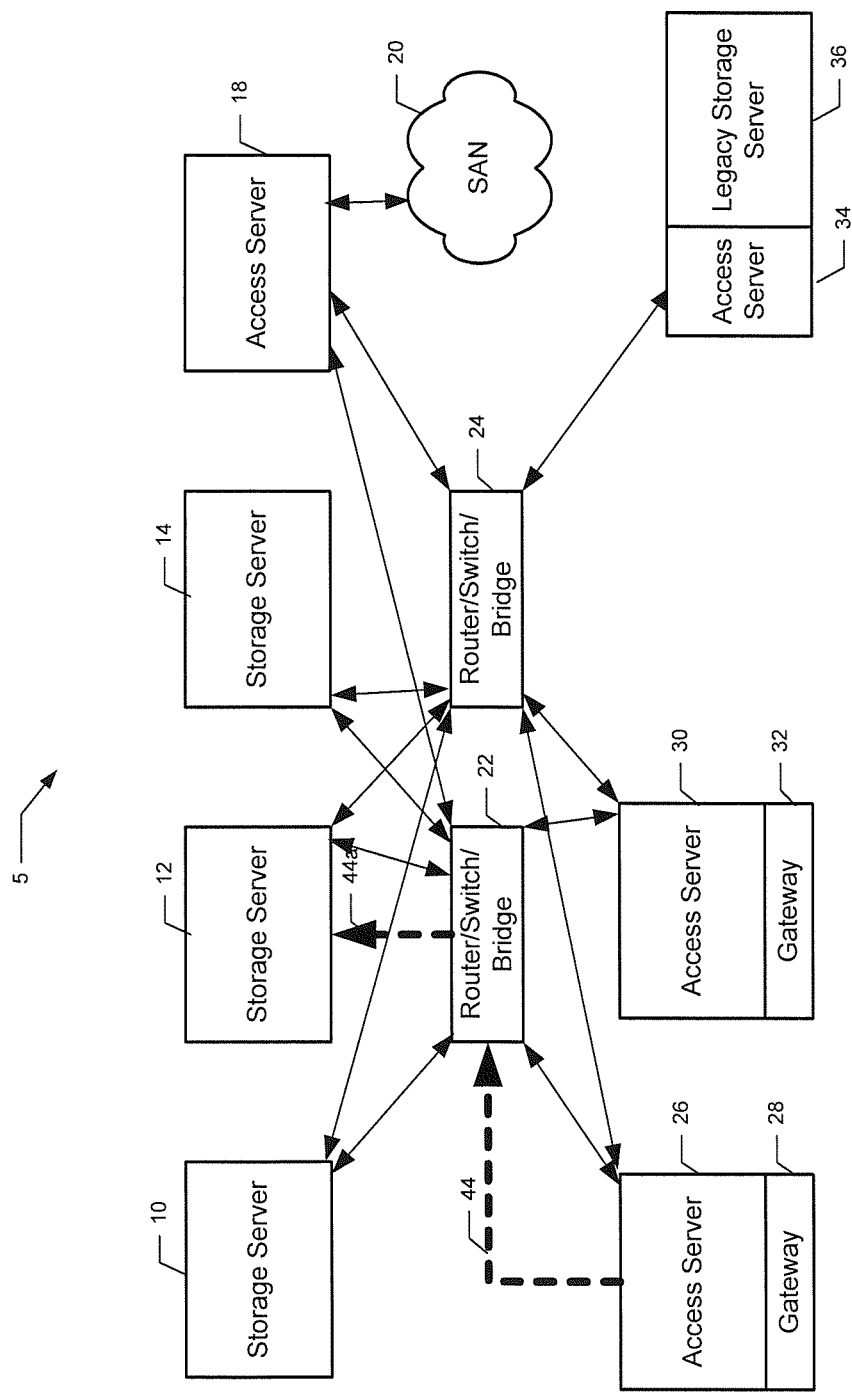
FIG. 3 is a block diagram showing the network arrangement of FIG. 1 in which the first access server evaluates the offers, selects one of the storage servers, and sends an action command to the selected storage server.

Referring now to FIG. 3, in which like elements of FIG. 1 are shown having like reference designations, the access server 26 can first evaluate the offers 42a, 42b (FIG. 2) received from the storage servers 10, 12, and can then select one of the offers (or none of the offers). Here shown as a dashed line 44, 44a, the access server 26 has accepted the offer 42b (FIG. 2) from the storage server 12 and has rejected the offer 42a (FIG. 2) from the storage server 10. The dashed line 44, 44a is indicative of an action command, described more fully below, sent from the access server 26 to the selected storage server 12.

The evaluation of the offers 42 can include, but is not limited to, a comparison of a bandwidth required by the access server 26 with the available bandwidth value provided in the offers 42a, 42b, a comparison of a maximum time delay required by the access server 26 with the delay of response value provided in the offers 42a, 42b, a comparison of the offer weight values provided in the offers 42a, 42b with a predetermined threshold value, and a relative comparison of the offer weight values provided in the offers 42a, 42b.

The action command 44, 44a can include, but is not limited to, a data identifier value and a data segment (range) value corresponding to selected stored data, a read action command corresponding to a read of the selected stored data from the storage server 12, wherein the read comprises a download of the selected stored data from the storage server 12 to the access server 26, an erase action command corresponding to an erase of the selected stored data within the storage server 12, an ingest action command corresponding to an ingest of the selected stored data within the storage server 12 to the at least one of other storage servers 10, 14, 36, or a change action command to change a characteristic of the selected stored data within the storage server 12. The characteristic changed can be a variety of characteristics also reported in the action command. For example, the changed characteristic can be a format of the data, wherein the selected data can be recomposed into another format. For other examples, the changed characteristic can be a video codec, a bit rate, an image resolution, a video container format, an access control and security metadata, a bandwidth quota, a client IP address restrictions, or a start and end time/date of data availability.

Figure 4:
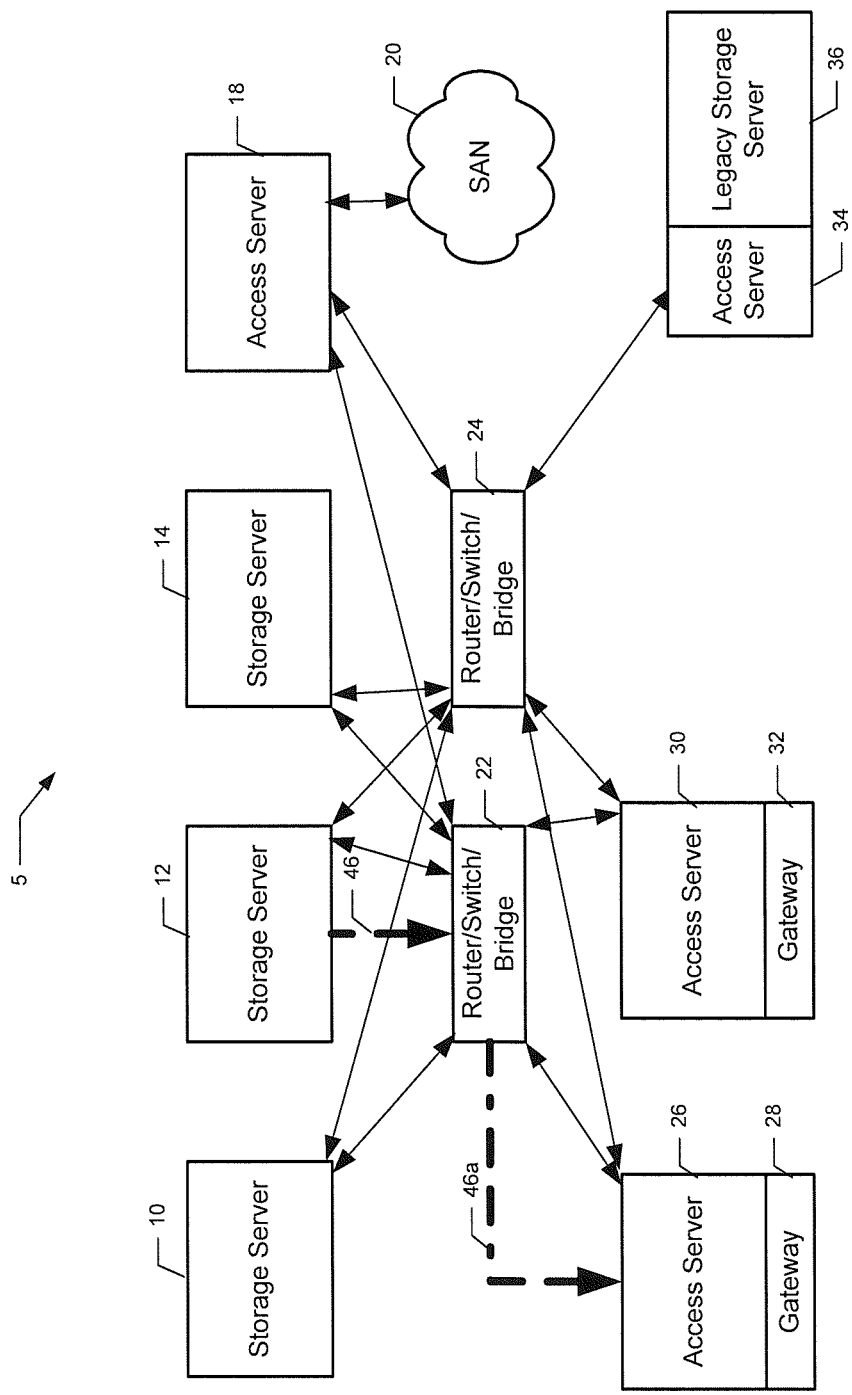
FIG. 4 is a block diagram showing the network arrangement of FIG. 1 in which the first access server receives selected data from the selected storage server.

Referring now to FIG. 4, in which like elements of FIG. 1 are shown having like reference designations, in the case where a read action command 44 was issued, the access server 26 can receive the selected data 46, 46a for example, video data from the selected storage server 12.

It should be apparent from the discussion above that the access server 26 has selected to receive the data 46, 46a from the storage server 12, after determining that the storage server 12 can meet the needs of the access server 26, e.g., data speed, bandwidth, etc.

It is possible that neither of the offers 42a, 42b (FIG. 2) from the storage serves 10, 12 are accepted by the storage server 26, in which case, the storage server 26 must seek fulfillments of its data requirements elsewhere in ways described below, for example, by way of a service hand-off.

FIGS. 5-8 are representative of a first example of a service hand-off FIGS. 9-12 are representative of a second example of a service hand-off.

Figure 5:
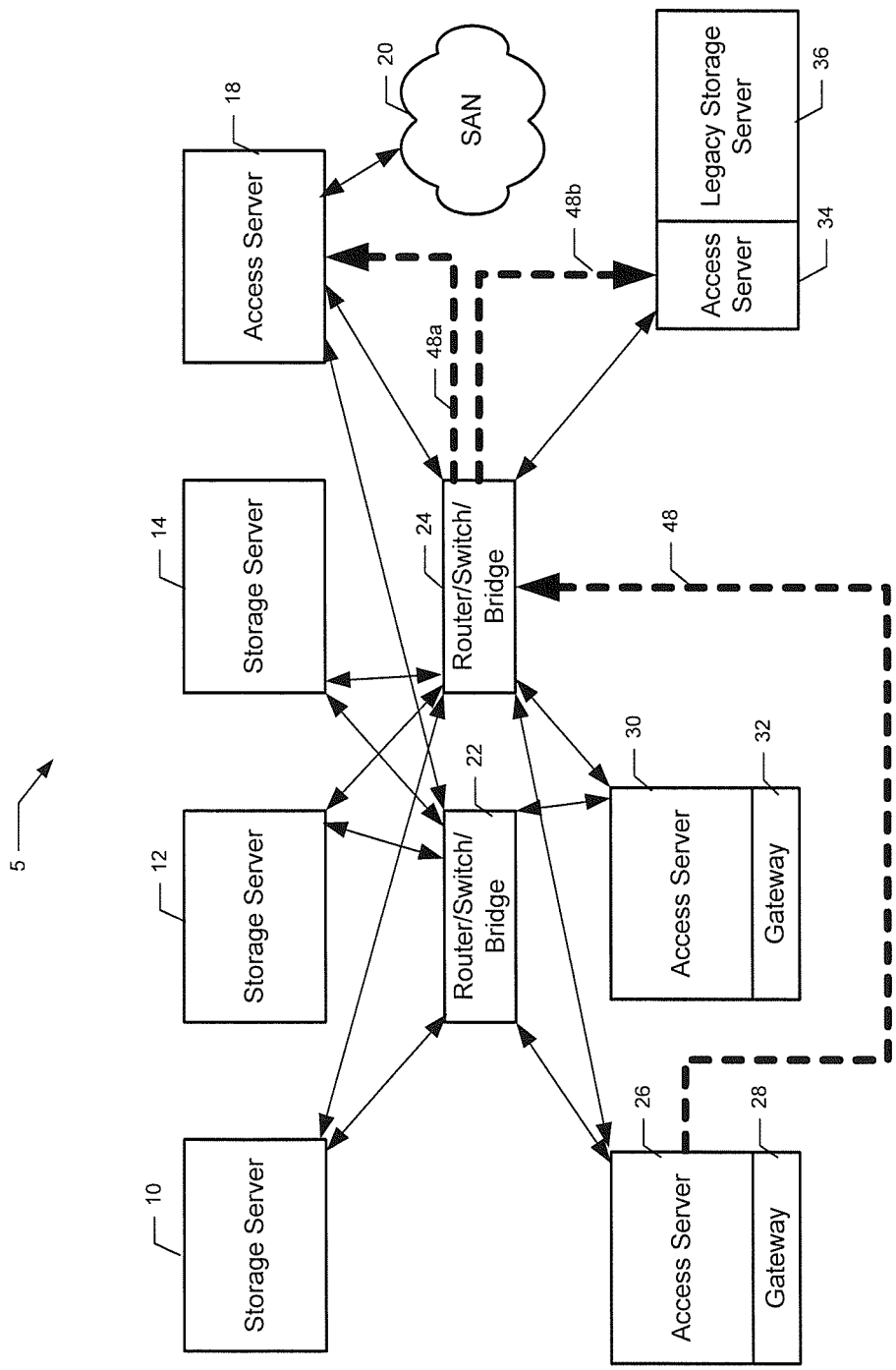
FIG. 5 is a block diagram showing the network arrangement of FIG. 1 in which the first access server sends a request for service hand-off to other access servers.

Referring now to FIG. 5, in which like elements of FIG. 1 are shown having like reference designations, in the case where the access server 26 has received no offers, or has evaluated offers and deemed them all to be unacceptable, the access server 26 can place a request for a service hand-off 48.

The hand-off request 48 can result in hand-off requests 48a, 48b to any number of access servers, here access server 18 and access server 34.

The request for service hand-off 48 can include, but is not limited to, a hand-off identifier, a hand-off data identifier (for the data being sought by the access server 26), a hand-off data segment (range) identifier, a hand-off read request, a hand-off ingest request, a hand-off erase request, a hand-off change request, a hand-off priority value, a hand-off urgency value, a hand-off query, a network address of the client originally requesting the data, or a network address of the access server requesting the handoff.

The elements of the request for service hand-off 48 are similar to the elements of the request 40 of FIG. 1, but taken from the context of a service hand-off, wherein the access server 26 is requesting offers from access servers remote from the access server 26 regarding the remote access servers and also regarding storage servers and data therein to which the remote access servers are coupled. Thus, an offer generated by a remote storage server pertains not only to aspects (e.g., bandwidth), of the remote access server but also to aspects (e.g., bandwidth) of a storage server selected by the remote access server.

Figure 6:
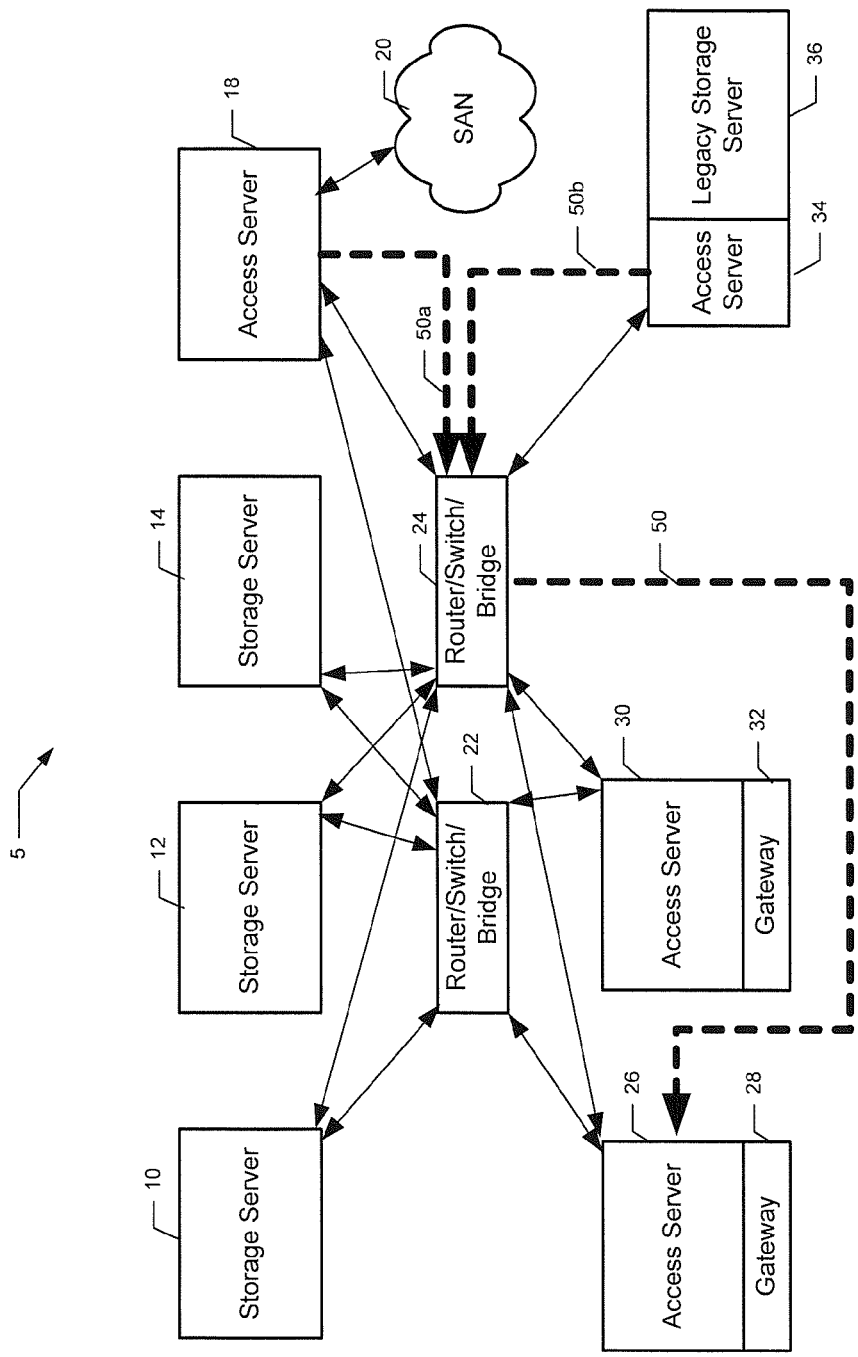
FIG. 6 is a block diagram showing the network arrangement of FIG. 1 in which the first access server receives hand-off offers from the other access servers.

Referring now to FIG. 6 in which like elements of FIG. 1 are shown having like reference designations, the request for service hand-off 48 of FIG. 5 can result in offers 50a, 50b for the service hand-off. The offers for the service hand-off 50a, 50b are received by the requesting access server 26. Similar to the offers 42a, 42b discussed above in conjunction with FIG. 2, the offers for the service hand-off 50a, 50b, 50 can include, but are not limited to, a respective hand-off data identifier value, a respective hand-off data availability identifier value, a respective hand-off null data identifier value, a respective hand-off data segment (data range) identifier value, a respective hand-off available bandwidth value, a respective hand-off range of bandwidth value, a respective hand-off probability of bandwidth value, a respective hand-off delay (speed) of response value, a respective hand-off range of delay of response value, a respective hand-off probability of delay of response value, a respective hand-off cost value (in terms of load upon the access server making the hand-off offer), or a respective hand-off current load value of the access server making the offer.

The hand-off offers 42a, 42b can also include a respective hand-off offer "weight" value indicative of a combination of one or more of the above-listed values. In other words, the hand-off offer weight value can be a number or numbers indicative of a combination of other ones of the hand-off values. In some embodiments, the hand-off offer weight value is indicative of one or more of the hand-off delay of response value, the hand-off available bandwidth value, the handoff cost value, or the hand-off current load value. However, other combinations of offer values are also possible to be within the hand-off offer weight value.

As described above, using the offer for the service hand-off 50a from the access server 18 as an example, the elements of the offer for the service hand-off 50a pertain not only to aspects (e.g., bandwidth) of the access server 18, but also to aspects (e.g., bandwidth) of a storage server (e.g., 14) selected by the remote storage server 18.

Figure 7:
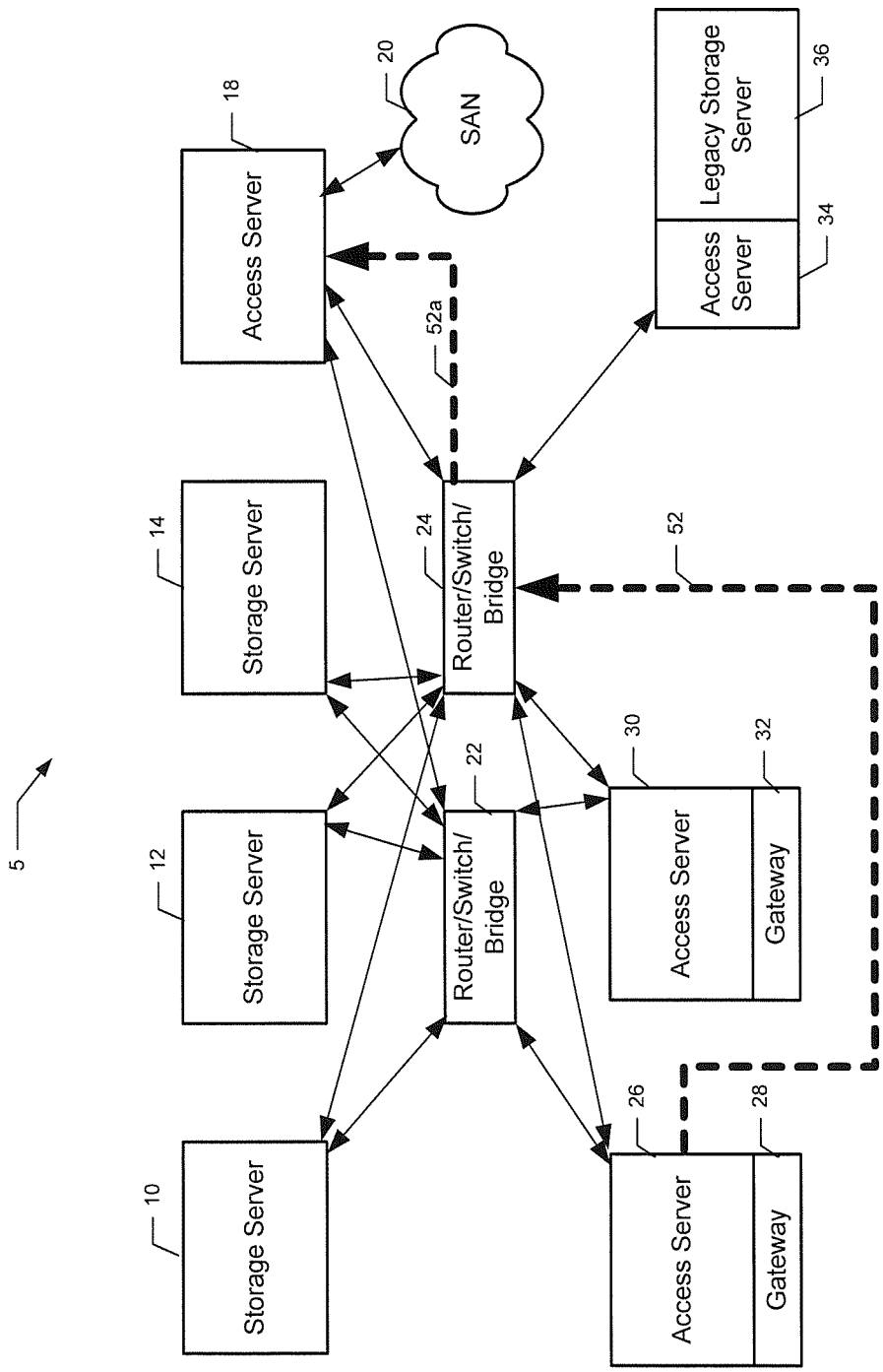
FIG. 7 is a block diagram showing the network arrangement of FIG. 1 in which the first access server evaluates the hand-off offers, selects a second access server, and sends a handoff action request to the second access server.

Referring now to FIG. 7, in which like elements of FIG. 1 are shown having like reference designations, the access server 26 can evaluate the service hand-off offers 50a, 50b, of FIG. 6, and can then select one of the offers (or none of the offers). Here shown as a dashed line 52, the access server 26 has accepted the offer 50a (FIG. 6) from the access server 18 and has rejected the offer 50b (FIG. 6) from the access server 34. The dashed line is indicative of a hand-off action command 52, 52a, described more fully below, sent from the access server 26 to the access server 18.

The evaluation of the offers 42 can include, but is not limited to, a comparison of a bandwidth required by the access server 26 with the band-off available bandwidth value provided in the offers 50a, 50b, a comparison of a maximum time delay required by the access server 26 with the hand-off delay of response value provided in the offers 50a, 50b, a comparison of the offer weight values provided in the offers 50a, 50b with a predetermined threshold value, and a relative comparison of the hand-off offer weight values provided in the hand-off offers 50a, 50b.

The service hand-off action command 52, 52a can include, but is not limited to, a hand-off data identifier value and a data segment (range) value corresponding to selected stored data, a hand-off read action command corresponding to a read of selected stored data, wherein the read comprises a download of the selected stored data from the access server 18 (and from a storage server selected by the access server 18) to the access server 26 and which is communicated to the access server 26, an hand-off erase action command corresponding to an erase of the selected stored data by the access server 18, a hand-off ingest action command corresponding to an ingest of the selected stored data from among the storage servers 10, 12, 14, 36, or a hand-off change action command to change a characteristic of the selected stored data by the access server 18. The characteristic changed can be a variety of characteristics also reported in the hand-off action command. For example, the changed characteristic can be a format of the data, wherein the selected data can be recomposed into another format by the access server 18. For other examples, the changed characteristic can be a video codec, a bit rate, an image resolution, a video container format, an access control and security metadata, a bandwidth quota, a client IP address restrictions, or a start and end time/date of data availability.

Figure 8:
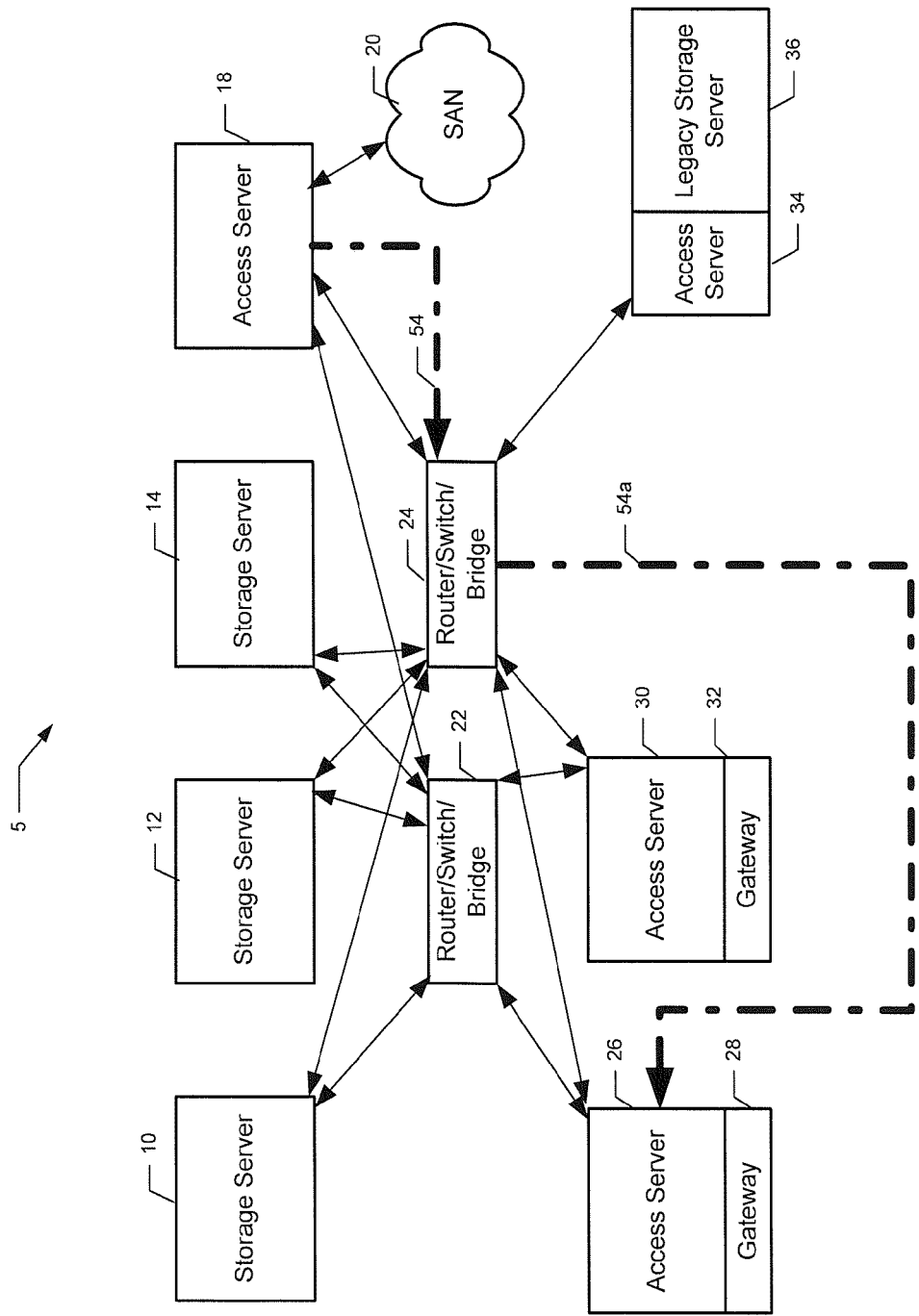
FIG. 8 is a block diagram showing the network arrangement of FIG. 1 in which the first access server receives selected data from the second access server.

Referring now to FIG. 8, in which like elements of FIG. 1 are shown having like reference designations, the selected access server 18 acts upon the action command 52, 52a of FIG. 7 and, if the action command 52 was a read action command, can provide the selected data 54, 54a retrieved by the access server 18 from one of the storage servers 10, 12, 14, selected by the access serve 18.

It will be recognized that the access server 26 can select one of the storage servers 10, 12, 14, 36 and can retrieve the selected data by way of the handshake described above in conjunction with FIGS. 1-4. The access servers 18, 34, in response to the request for service hand-off 48, 48a, 48b of FIG. 5 made by the access server 26, can send their own requests to storage servers to which they are connected, in order to identify if they can access the data requested originally by the access serve 26 on a storage server to which they are connected, and if they can access the data with a bandwidth requested in the request for service hand-off 48, 48a, 48b from the access server 26. The requests (not shown) result in associated offers from the storage servers as in FIG. 2, evaluations by the access servers 18, 34, and resulting offers 50a, 50b, 50 from the access servers 18, 34 in response to the request for service hand-off 48, 48a, 48b of FIG. 5.

As described above, FIGS. 9-12 are representative of a second example of a service hand-off.

Figure 9:
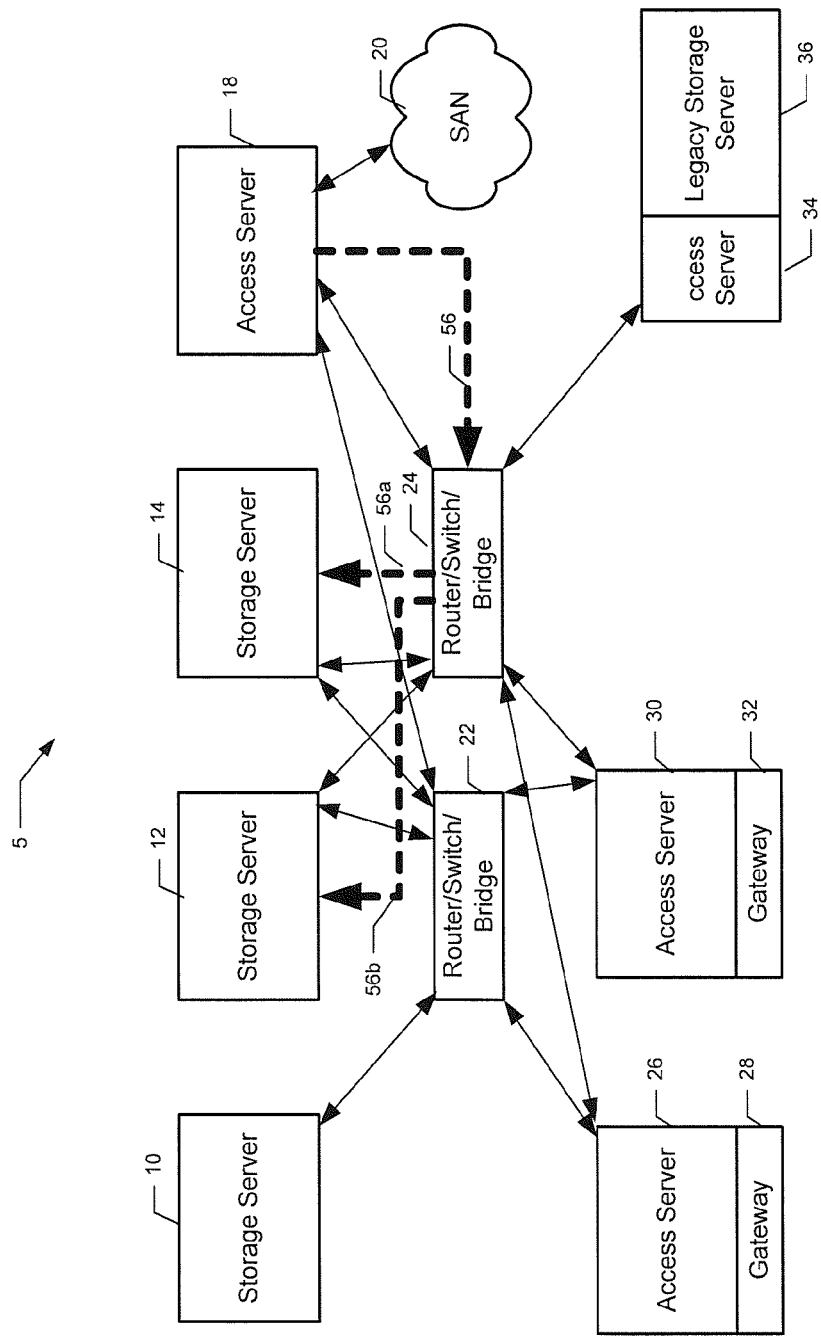
FIG. 9 is a block diagram showing the network arrangement of FIG. 1 in which an access server sends a request to storage servers but receives no offers.

Referring now to FIG. 9, in which like elements of FIG. 1 are shown having like reference designations, the access server 18 sends a request 56, 56a, 56b to all of the storage servers to which it is connected, but receives no offers.

Figure 10:
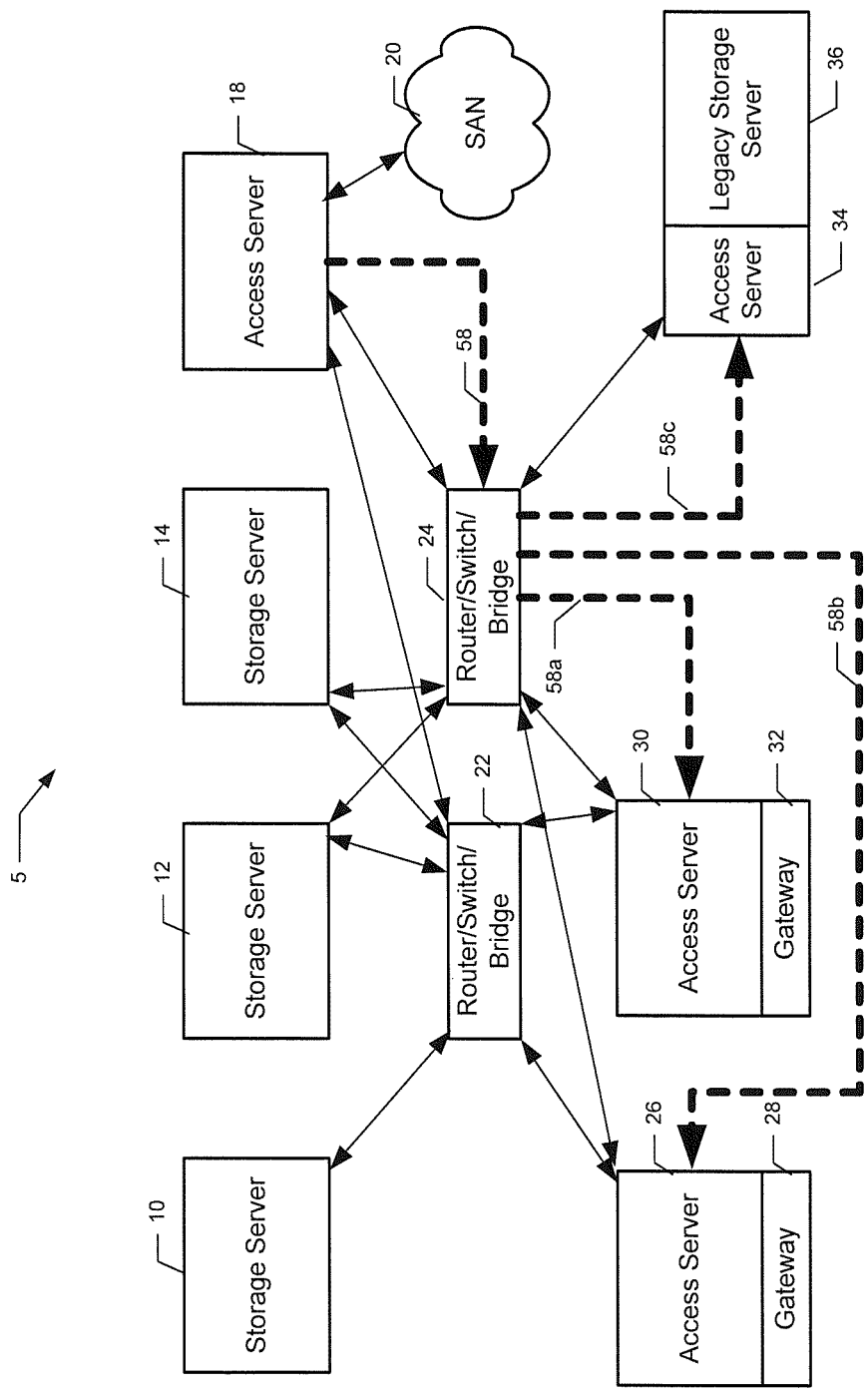
FIG. 10 is a block diagram showing the network arrangement of FIG. 1 in which the access server sends a request for service hand-off to other access servers.

Referring now to FIG. 10, in which like elements of FIG. 1 are shown having like reference designations, the access server 18 sends a request for a service hand-off 58, 58a, 58b, 58c to the access servers 26, 30, 34 to which it is connected. In the request, the access server 18 identifies the data for which it is looking.

Figure 11:
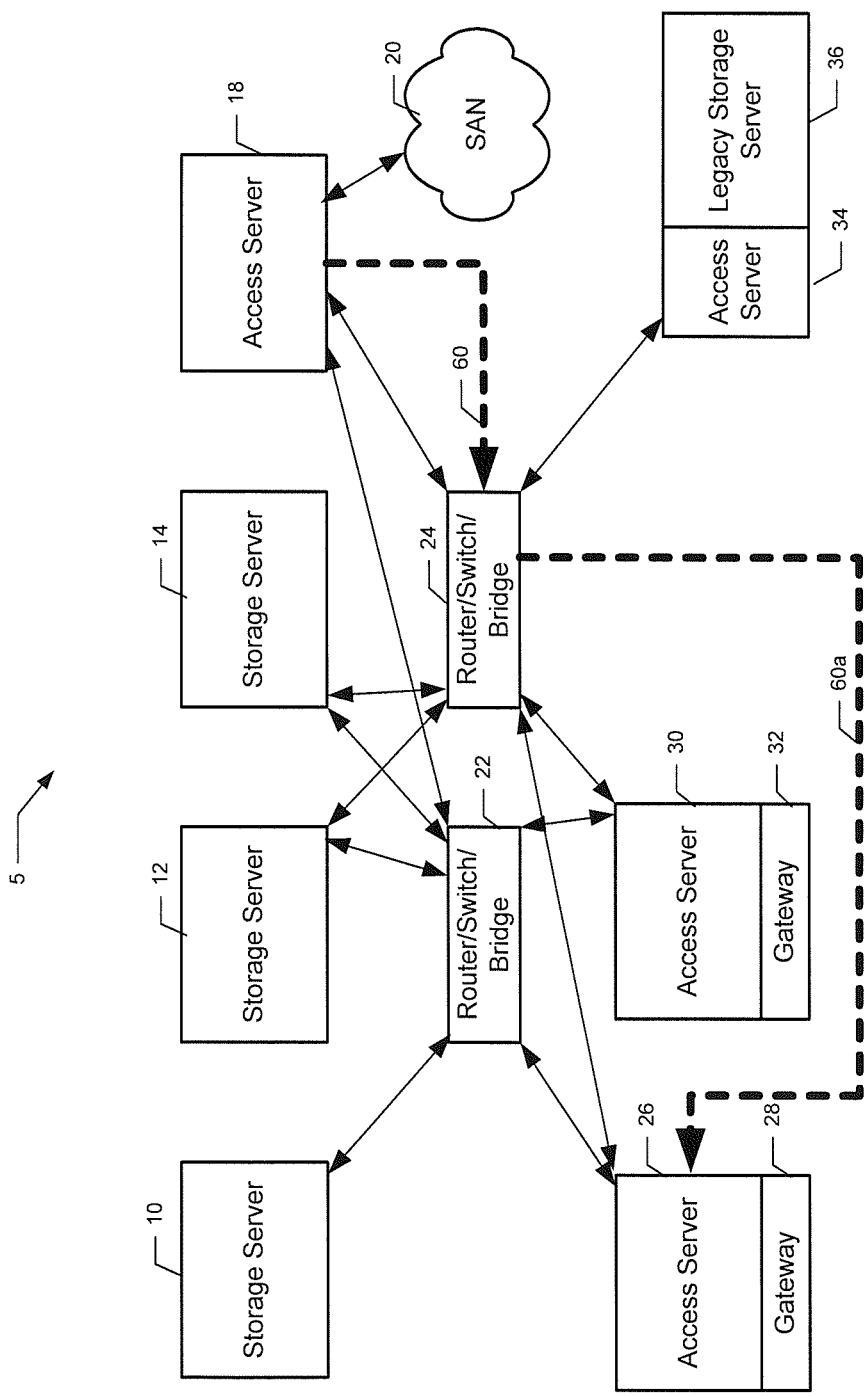
FIG. 11 is a block diagram showing the network arrangement of FIG. 1 in which the access server evaluates hand-off offers (not shown), selects an access server for the service hand-off, and sends a hand-off action command to the selected access server.

Referring now to FIG. 11, in which like elements of FIG. 1 are shown having like reference designations, the request for service hand-off 58, 58a, 58b, 58c of FIG. 10 result in one or more hand-off offers (not shown) from the access servers 26, 30, 34, the access server 18 evaluates the hand-off offers, selects the access server 26 for the service hand-off, and send a hand-off action request 60, 60a, e.g., a hand-off read request including identification of the desired data, to the access server 26.

Figure 12:
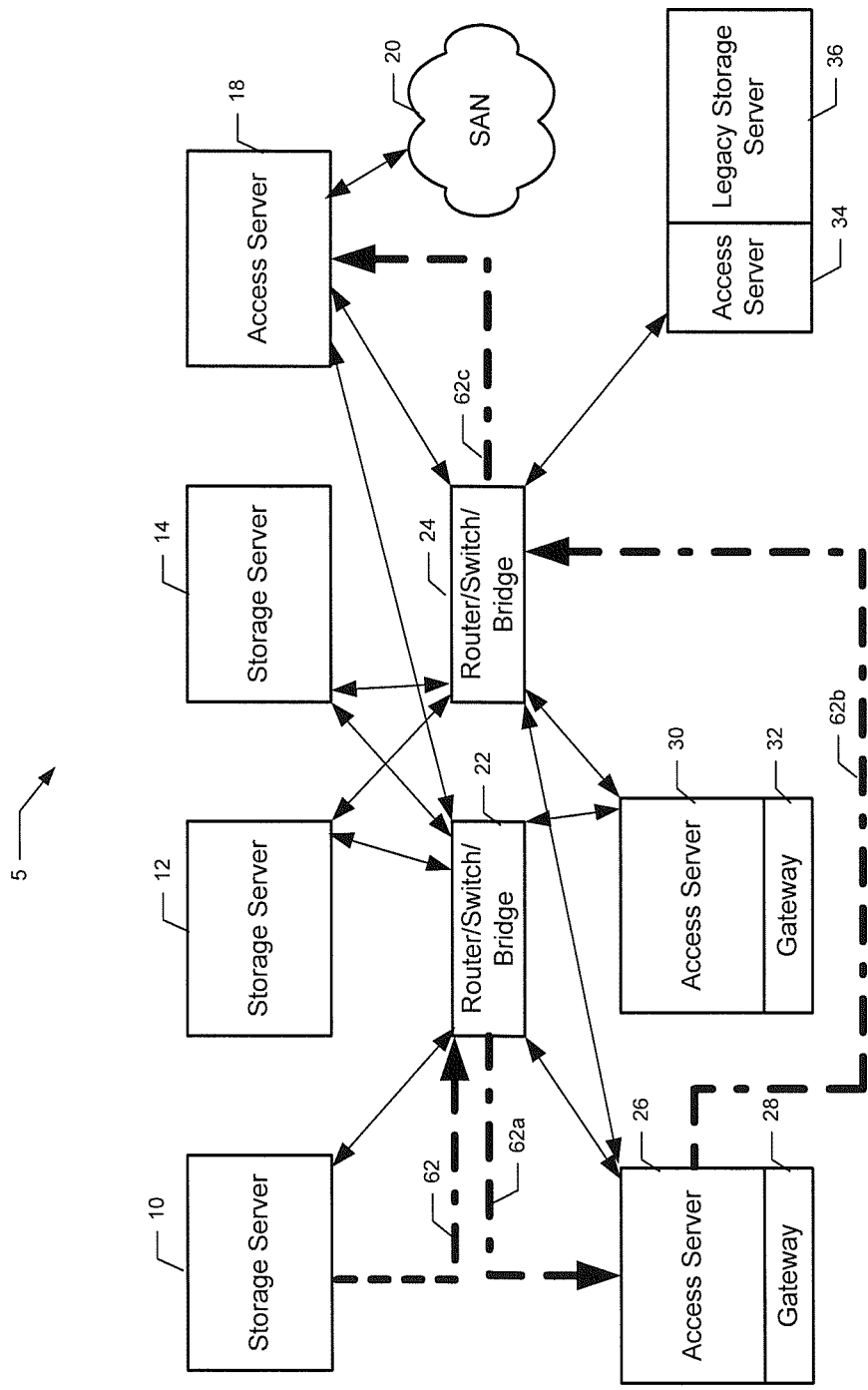
FIG. 12 is a block diagram showing the network arrangement of FIG. 1 in which the access server receives selected data from the selected access server.

Referring now to FIG. 12, the access server 26 acquires the requested data 62, 62a from the storage server 10 and communicates the requested data 62b, 62c to the access server 18 that originally requested the service hand-off.

It will be appreciated that, with this hand-off arrangement, the access server 18 can receive the requested data 62 from the storage server 10, to which the storage server 18 may have no direct connection and may have no knowledge of.

Similar to the description above in conjunction with FIG. 8, it will be understood that the access server 26 can retrieve the data 62, 62a, 62b, 62c in a way as described above in conjunction with FIGS. 1-4, but this retrieval is not shown. The access servers 18, 34, after the request for service hand-off 58, 58a, 58b of FIG. 10 are made by the access server 18, can send their own requests to storage servers to which they are connected, in order to identify if they can access the data requested originally by the access server 18 on a storage server to which they are connected, and if they can access the data with a bandwidth requested in the request for service hand-off 58, 58a, 58b from the access server 18. The requests (not shown) result in offers from the storage servers as in FIG. 2, evaluations by the access servers 26, 36, 34, and resulting offers (not shown) from the access servers 26, 30, 34, in response to the request for service hand-off 58, 58a, 58b of FIG. 10.

Figure 17:
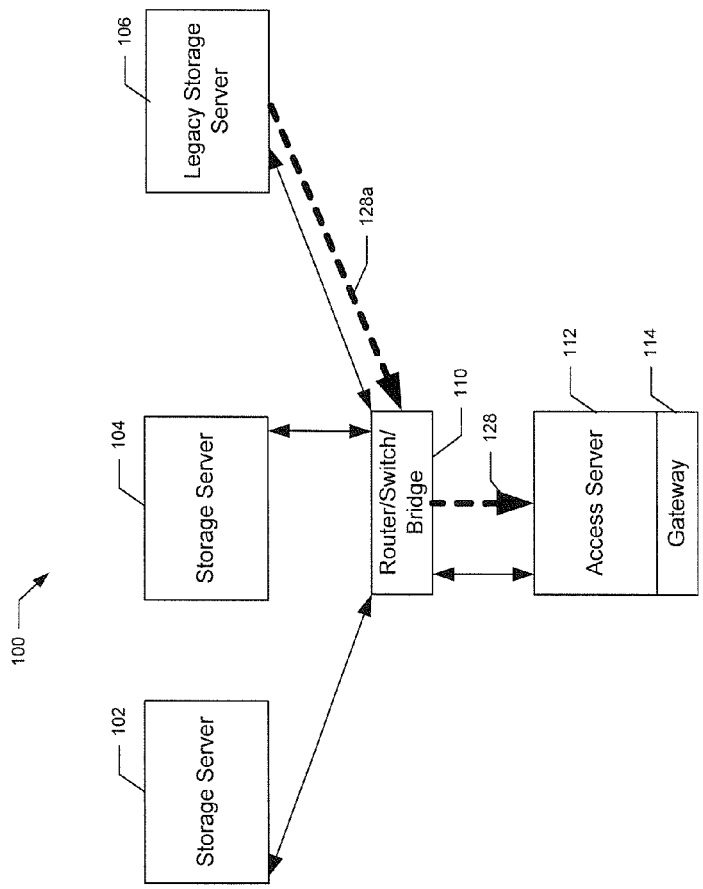
FIG. 17 is a block diagram showing the network arrangement of FIG. 13 in which the offer in response to the request of FIG. 13 comes only from a legacy storage server.
Figure 18:
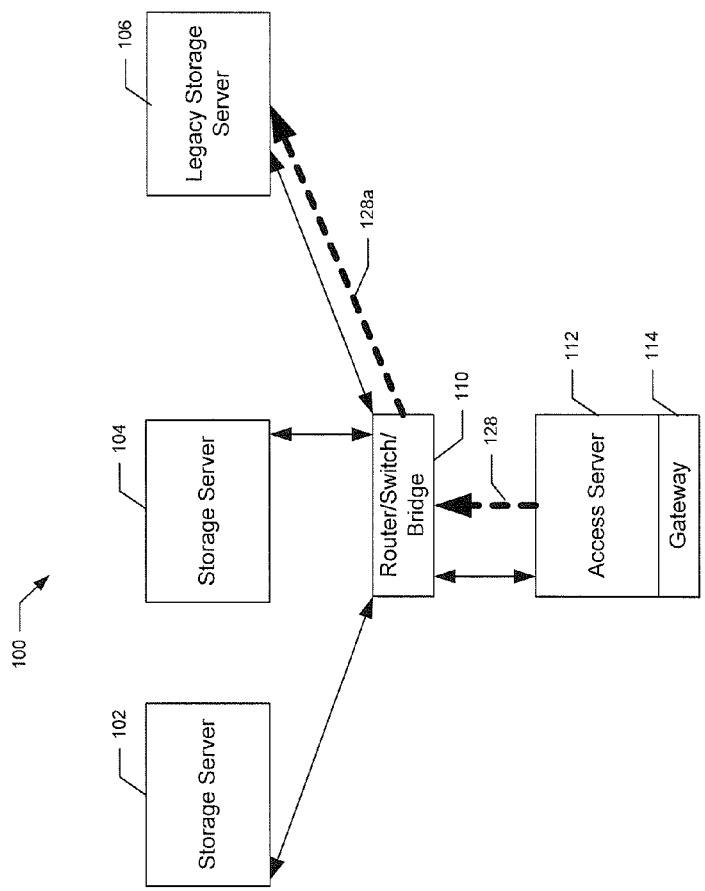
FIG. 18 is a block diagram showing the network arrangement of FIG. 13 in which the storage server sends an action command to the legacy storage server.
Figure 19:
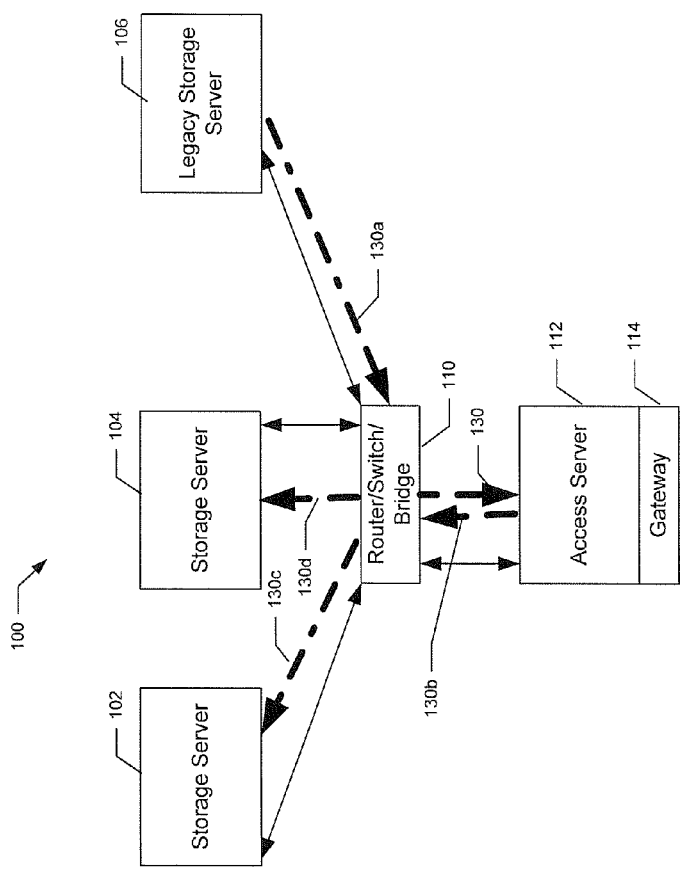
FIG. 19 is a block diagram showing the network arrangement of FIG. 13 in which the access server receives selected data from the legacy storage server and also writes the selected data to one or more other storage servers.

FIGS. 13-16 show an example of a request serviced by a storage server as in FIGS. 1-4. FIGS. 17-19 show an example of a request serviced by a legacy storage server along with an ingest from the legacy storage server to another storage server.

Figure 13:
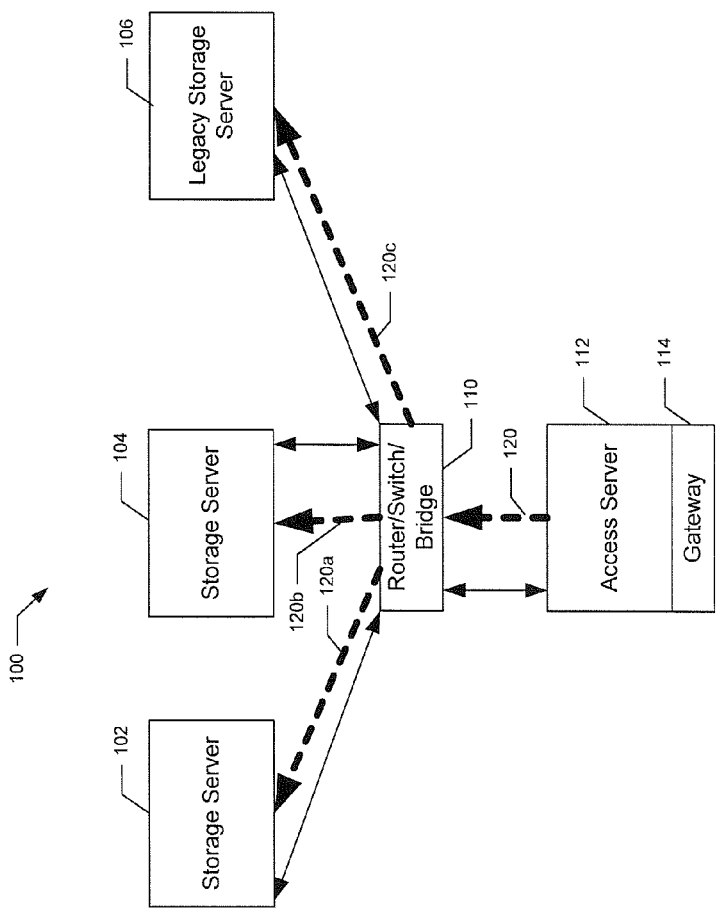
FIG. 13 is a block diagram showing another exemplary network arrangement having an access server and storage servers in which a request is made by the access server to the storage servers.

Referring now to FIG. 13, a network 100 includes an access server 122 is coupled through a router, bridge, or switch 110 to storage servers 102, 104, and also to a legacy storage server 106.

The access server 112 directs a request 120 to the storage servers 102, 104 and also to the legacy storage server 108, which arrive as requests 120a, 120b, 120c.

Figure 14:
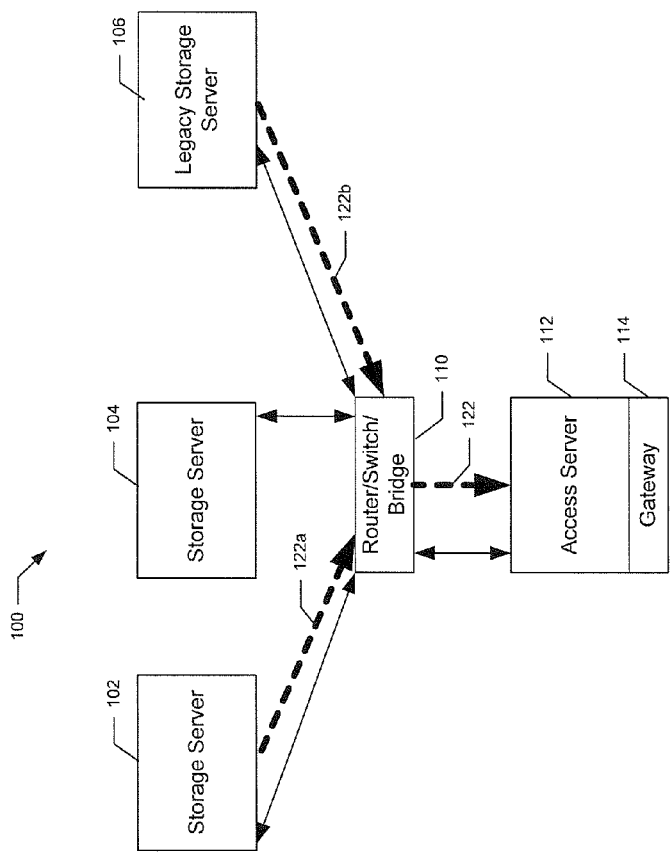
FIG. 14 is a block diagram showing the network arrangement of FIG. 13 in which the access server receives offers from the storage servers.

Referring now to FIG. 14, in which like elements of FIG. 13 are shown having like reference designations, the storage server 102 and the legacy storage server 106 provide offers 122a, 122b as described above in conjunction with FIG. 2.

Figure 15:
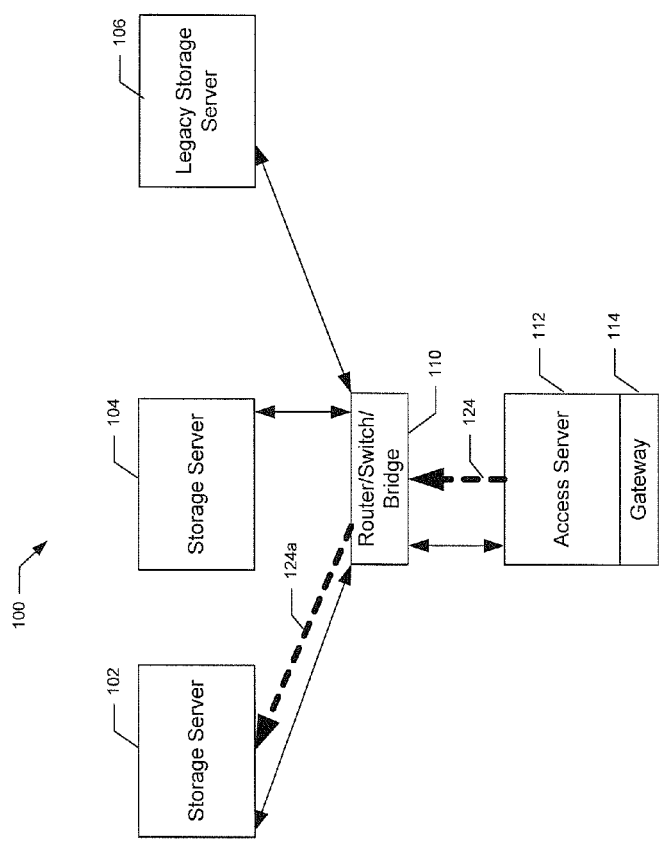
FIG. 15 is a block diagram showing the network arrangement of FIG. 13 in which the access server evaluates the offers, selects a storage server, and sends an action command to the selected storage server.

Referring now to FIG. 15, in which like elements of FIG. 13 are shown having like reference designations, the access server 112 evaluates the offers as described above in conjunction with FIG. 3, selects a best one of the storage servers 102, 104, 106, and sends an action command 124, 124a (e.g., a read data action command) to the selected storage server 102, also as described above in conjunction with FIG. 3.

The access server 112 can select a storage server that provides a better weight value, favoring a storage server that can provide fastest access to the desired data.

Figure 16:
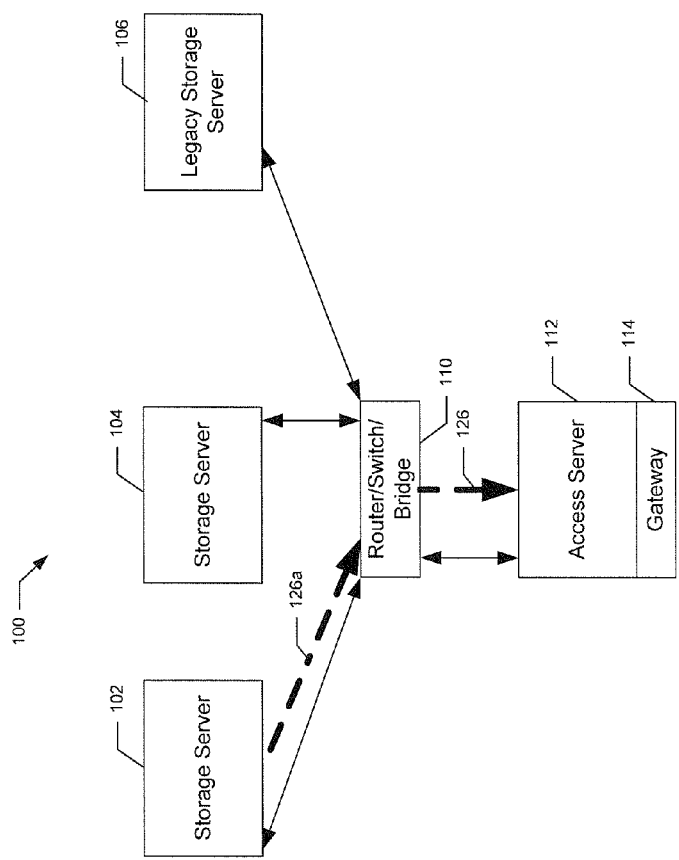
FIG. 16 is a block diagram showing the network arrangement of FIG. 13 in which the access server receives selected data from the selected storage server.

Referring now to FIG. 16, in which like elements of FIG. 13 are shown having like reference designations, the storage server 102 provides requested data 126a, 126 to the access server 112.

Referring now to FIG. 17, in which like elements of FIG. 13 are shown having like reference designations, unlike the communication of FIG. 14, in response to the request 120 120a, 120b, 120c of FIG. 13, only the legacy storage server 106 responds with an offer 128a, 128. Therefore, the access server 112 has only one option and no evaluation of the offer is necessary.

Referring now to FIG. 18, in which like elements of FIG. 13 are shown having like reference designations, the access server 112 sends an action request 128, 128a to the legacy storage server. The action request can be, for example, a read request with a selection of requested data. However, the action request can also be any of the above-listed action requests, for example, an ingest request with a selection of the requested data.

Referring now to FIG. 19, in which like elements of FIG. 13 are shown having like reference designations, the access server 112 receives the requested data 130a, 130. Where the action requests was in ingest request (or a read request), the access server 112 can write the requested data 130c, 130d to one or more other access server 102, 104. In some embodiments, the access server 112 can write portions (segments) 130c, 130d of the requested data 130a to the storage servers 102, 104, which portions can be the same portion or different portions of the requested data 130a. In some embodiments, the access server 112 can write portions (segments) 130c, 130d of the requested data 130a having different formats to the storage servers 102, 104, which portions can be the same portion or different portions of the requested data 130a. Where the action request was a read request, the access server 112 can still write the portions (segments) 130c, 130d of the requested data 130a to the storage servers 102, 104, for example, as a means of caching the data for faster data access in the future.

Figure 20:
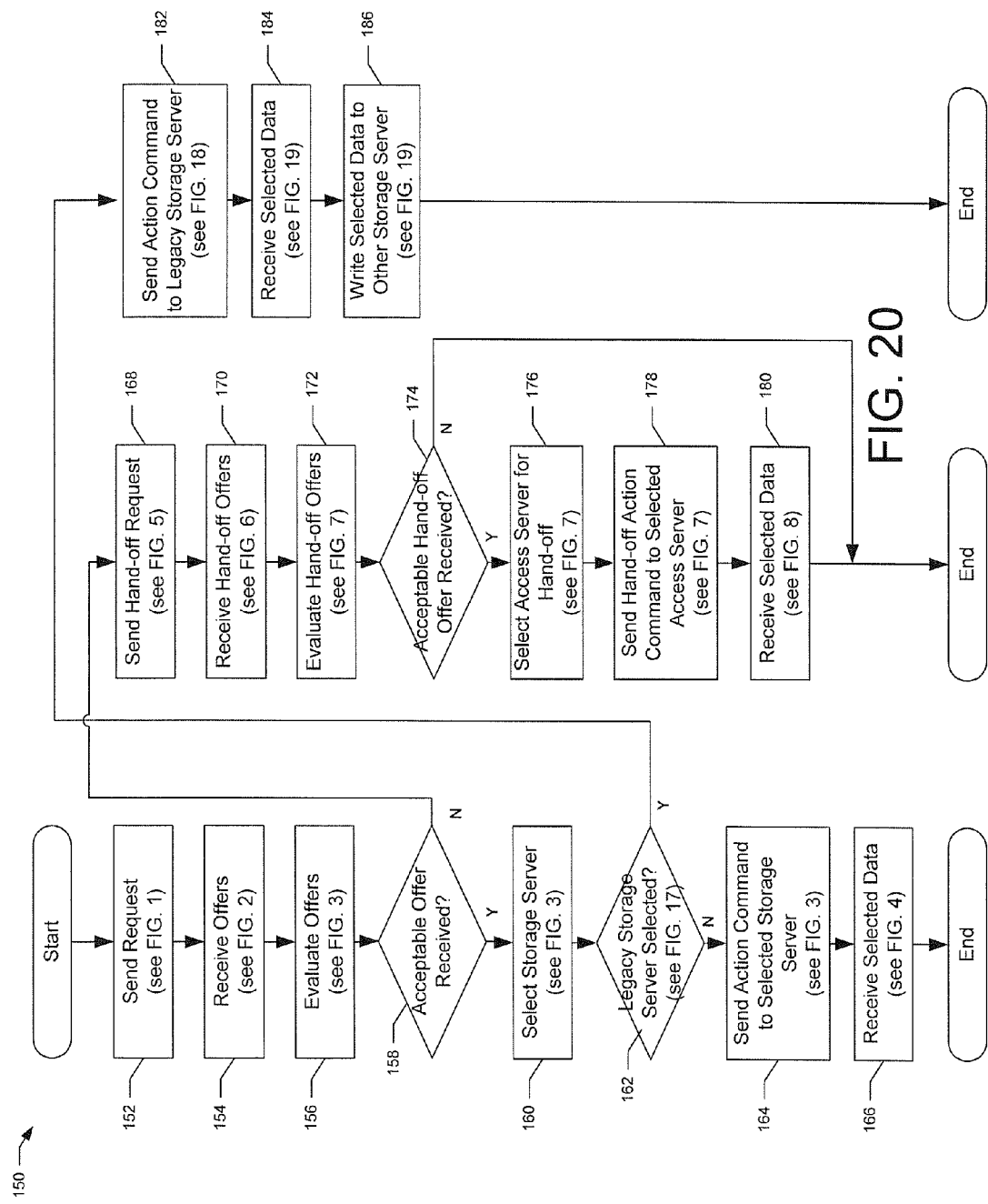
FIG. 20 is a flow chart showing a combination of various actions that can be taken by an access server and by a storage server.

It should be appreciated that FIG. 20 shows a flowchart corresponding to the below contemplated technique which would be implemented in access server 26 of FIGS. 1-12 or in access server 112 of FIGS. 13-19. Rectangular elements (typified by element 152 in FIG. 20), herein denoted "processing blocks," represent computer software instructions or groups of instructions. Diamond shaped elements (typified by element 156 in FIG. 20), herein denoted "decision blocks,"

represent computer software instructions, or groups of instructions, which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of blocks described is illustrative only and can be varied without departing from the spirit of the invention. Thus, unless otherwise stated the blocks described below are unordered meaning that, when possible, the steps can be performed in any convenient or desirable order.

Referring now to FIG. 20, a process 150 is taken from the perspective of one access server, for example, the access server 26 of FIGS. 1-12. The process begins at block 152, where the access server sends a request for selected data, for example, as described above in conjunction with FIG. 1.

At block 154, the access server receives offers, for example, as described above in conjunction with FIG. 2.

At block 156, the access server evaluates the offers, for example, as described above in conjunction with FIG. 3.

At block 158, if the access server has received an acceptable offer, the process continues to block 160, where the access server selects a storage server, for example, as described above in conjunction with FIG. 3.

At block 162, the access server determines if the selected storage server is a legacy storage server (or other less desirable storage server). If the selected storage server is not a legacy storage server, the process continues to block 164.

At block 164, the access server sends an action command, along with identification of the selected data, (and with the data itself in the case of a write action command) to the selected storage server, for example, as described above in conjunction with FIG. 3.

At block 166, the access server receives the selected data from the selected storage server, as described above in conjunction with FIG. 4.

If at block 158 an acceptable offer was not received, the access server attempts a service hand-off, beginning at block 168, where a request for a service hand-off along with identification of the selected data is sent to other access servers, for example, as described above in conjunction with FIG. 5.

At block 170, the access server receives offers for the service hand-off from other access servers, for example, as described above in conjunction with FIG. 6.

At block 172, the access server evaluates the offers for the service hand-off, for example, as described above in conjunction with FIG. 7.

At block 174, if an offer for service hand-off is acceptable, the process proceeds to block 176.

At block 176, the access server selects an access server for the service hand-off, for example, as described above in conjunction with FIG. 7.

At block 178, the access server sends a hand-off action command, along with identification of the selected data, to the selected other access server, for example, as described above in conjunction with FIG. 7.

At block 180, the access server receives the selected data from the other access server for example, as described above in conjunction with FIG. 8.

If at block 174, there has been no acceptable offer for service hand-off, the process ends.

If at block 162, the selected server is a legacy storage server, then the process continues to block 182, where an action command is sent to the legacy storage server with an identification of the selected data, for example, as described above in conjunction with FIG. 18.

At block 184, the access server receives the selected data form the legacy storage server, for example, as described above in conjunction with FIG. 19.

At block 186, the access server writes the received selected data to one or more other storage servers, for example, as described above in conjunction with FIG. 19.

Figure 21:
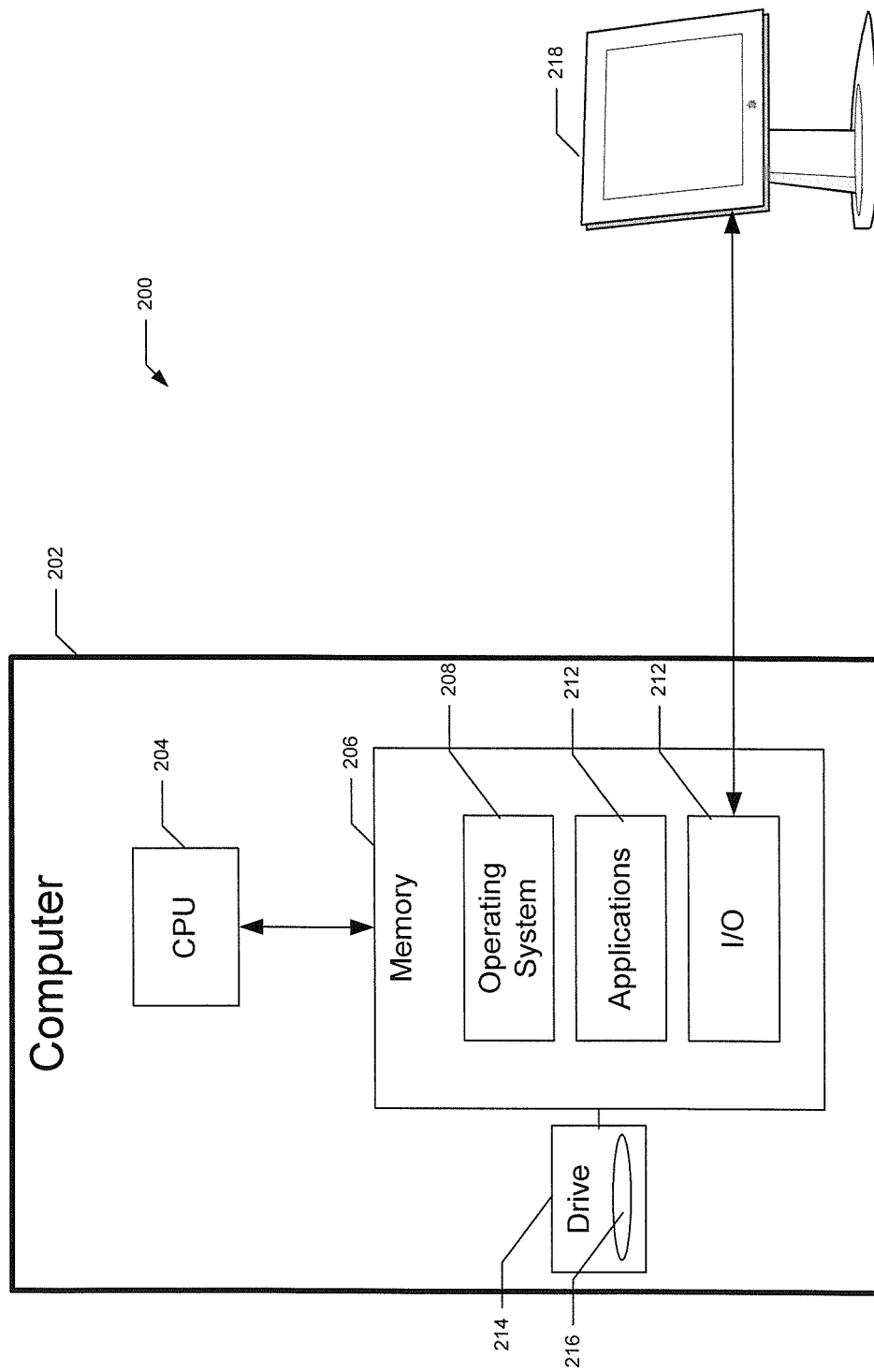
FIG. 21 is a block diagram showing a computer having a computer-readable storage medium.

Referring now to FIG. 21, a computer system 200 can include a computer 202 and a display device 218. The computer 1202 can include a central processing unit (CPU) 204 coupled to a computer-readable memory 206, a form of computer-readable storage medium, which can, for example, be a semiconductor memory. The memory 206 can store instructions associated with an operating system 208, associated with applications programs 212, and associated with input and output programs 212, for example a video output program resulting in a video output to the display device 218.

The computer 202 can also include a drive device 214, which can have a computer-readable storage medium 216 therein, for example, a CD or a floppy disk. The computer-readable storage medium 206 and/or the computer-readable storage medium 216 can be encoded with computer-readable code, the computer-readable code comprising instructions for performing at least the above-described processes.

The computer 202 can be an access server, a storage server, or both, in any of the embodiments described above. The display device 218 can be associated with a user. The I/O programs 212 can include a gateway.

The discussion above regarding segmentation of content and opportunistic servicing of requests does not specifically address management of the content in the system. Content management is the subject of parts of above-described U.S. Provisional Application No. 61/222,167 filed Jul. 1, 2009 and also U.S. Provisional Application No. 61/227,832 filed Jul. 23, 2009. Excerpts from those Provisional applications are recited below.

A conventional approach to management of content tends to centrally track the location of content in storage (i.e., provides a central object directory). This approach has certain drawbacks. A first drawback is the sheer size of a central object directory. Another drawback is the difficulty of providing back-up for the central object directory. Other drawbacks include lack of resilience, such as protection and recovery from hardware failures.

In contrast, the above-described systems and methods allow requests to be broadcast, by access servers, to certain subsets of storage servers for certain segments of content. This architecture, in effect, presents a network, which is geared towards distribution.

The physical architecture shown, for example, in FIG. 1 above, is similar to conventional physical layouts, with distinct access servers, storage servers, and switches connecting the access servers to the storage servers.

The contents of each storage server (object directories) are kept at the storage server itself. Requests from the access servers are serviced in an opportunistic fashion by posting requests, possibly through a Java space or similar approach. The request can use the intrinsic multicast ability of an associated switch (e.g., 22, FIG. 1), for example, through VLANs for Ethernet switches. Different requests (i,j) and (i', j') are sent over respective VLANs 1 and 2 (associated with routers/bridge/switch 22, 24, respectively).

Reliability in this case is addressed by allowing a type of overprovisioning, which is useful during normal operation (in the absence of failures). Rather than have a spare switch that operates as a hot spare, the two switches 22, 24 (FIG. 1) are operational at all times. In this way, the spare capacity needed for reliability is of use during normal operation. During normal operation, the load on each switch 22, 24 can be roughly half of the total load, if the traffic due to downloading data dominates the messaging traffic required to establish the download.

Using simple M/M/1 queuing assumptions, the switches 22, 24 act as two servers with load $$\frac{\lambda}{2}$$

each. If the system is loaded to 90% of the recoverable capacity, then the average waiting time under normal operation (i.e. in the absence of failure) is 0.81 (units are neglected, since comparisons are in relative terms). In case of failure, the waiting time will become 9. However, note that, if the second switch 24 had been used only as a hot spare, then under both normal and failure mode, the waiting time would have been 9. Thus, the spare capacity afforded by the second switch 24 would not have been of any use in improving the service during normal operation.

If the system is loaded to 70% of the recoverable capacity, then the average waiting time under normal operation is 0.54. In the case of failure or of normal operation with a single switch, the waiting time would be 2.33. Thus, the approach described herein has a considerable benefit under normal operating conditions and offers the same performance under a failure condition. Note that, with the architecture of FIG. 1, the system can be allowed to exceed its recoverable capacity by a factor of 2, whereas a traditional approach with a hot spare cannot allow this flexibility. Thus, if spikes of activity occur under normal operation, they may be accommodated, albeit in such a manner where the majority but not all of the traffic would be recoverable.

An added advantage of the architecture of FIG. 1 is in the management of the NICs (within the storage servers 10, 12, 14 and within the legacy access server 34) and switches 22, 24.

A NIC failure is a more likely event than the failure of a switch, although its effect is lesser on the system at large. A traditional high-reliability enterprise-networking approach uses dual NICs, one per server, coupled to each of the two switches (22, 24, FIG. 1). If there are dual NICs for each switch then, in case of failure of the primary NIC for the primary switch, the system 5 of FIG. 1 can switch to the secondary NIC, which also requires changing use to the secondary switch. This means that the secondary switch must then communicate to the primary switch, through an inter-switch connection (not shown), in order to allow continued connection to servers that are still connected to the primary switch. This inter-switch connection imputes further complexity in traffic management, and the ports required to establish the inter-switch communication cannot be used for conveying traffic during normal operation. Thus, the switch's port and, consequently, its throughput, are lowered by the need to establish an inter-switch connection. Hence, the performance of the switch (e.g., 22, 24) under even normal operating conditions will be lower in the case of the use of back-up switches and inter-switch communication. In order to alleviate such an issue, we may use dual NICs for the primary switch and a single (or dual) NIC for the secondary switch.

One reason why the network arrangement 5 of FIGS. 1-12 achieves performance advantages with respect to traditional architectures is the network arrangement 5 provides requests and offers to such requests in order to establish connections, rather than merely establishing specific connections. In a conventional SAN, a request for a piece of content (data) corresponds to selecting a particular sector on a disk. That sector is then reached by establishing the appropriate dedicated connection across a network, e.g., using fiber channel or some Ethernet version.

In the above-described arrangements, ingest can be managed in a manner similar to delivery. Thus, at time of ingest, requests for ingest of segments of content can be sent to the storage servers or to subgroups of these storage servers. The ingest request can include the desired characteristics of the storage (number of copies, type of storage, location on disk) that are desired.

The network arrangement 5 of FIGS. 1-12 delivers content, an operating context in which reads far exceed writes in their frequency. While some of the servers may not be in physical proximity to one another, the network is its own entity built for content delivery. For example, in some embodiments, the network arrangement 5 of FIGS. 1-12 provides delivery of video content effectively and rapidly. Access to the DAN occurs through the access servers 26, 28.

The above-described network arrangement 5 of FIGS. 1-12 is well suited for streaming, which segments content and progressively accesses these segments for playing at the application level. Requests for segments arising from streaming applications naturally map to the above-described requests. Such requests may be linked.

A so-called "edge" exists between an access server and a storage server if the two are connected by a VLAN and if the storage server has the ability to service the request because it has the piece of content that was requested and is not currently engaged in servicing another request. Assume A storage servers and B access servers. If an edge exists between storage server α and access server β, we set the Boolean random variable $e_{\alpha,\beta}$ to 1. Otherwise, set $e_{\alpha,\beta}$ to 0. Now consider a mapping that will depend on current conditions in the system, and consider the storage server that will serve the request for a segment of content. Each storage server α has sectors grouped according to $k_\alpha$ different groups $S_1, \ldots, S_{k_\alpha}$ that form a partition of $\{1, \ldots, m_\alpha\}$. Each group has a benefit, $\delta_r^\alpha$, associated with it, which may be given in terms of delay.

Let $\kappa(y,\alpha)$ be the content residing in storage location y on storage server α. Thus, we have a mapping:

$$\kappa : \{1 \ldots \max(m_a)_{a=1 \ldots a}\} \times \{1 \ldots A\} \mapsto \{1 \ldots q\}$$

$$(y, \alpha) \to \kappa(y, \alpha).$$

Also consider the access server from which the request proceeds, through the mapping:

$$o : \{1 \ldots q\} \times N \mapsto \{1 \ldots B\}$$

$$(i, j) \to o(i, j).$$

Using the natural extensions of notation, given our setting, from the problem above:

$$b\begin{pmatrix} d(1,\min(1,N_1)), \ldots, & d(1,\min(N_1,\chi_1)), \ldots, \\ d(1,\min(1,N_q)), \ldots, & d(1,\min(N_q,\chi_q)) \end{pmatrix} =$$

$$\sum_{\alpha=1}^{A}\sum_{i=1}^{q}\sum_{j=\min(1,N_1)}^{\min(N_1,\chi_1)}\sum_{y=1}^{m_\alpha} d(i,j)[y,\alpha]\delta_r^\alpha \Im(y,r,\alpha)$$

where we additional constraints are:
$d(i,j)[y,\alpha]=0$ if $\kappa(y,\alpha)\neq i$
$d(i,j)[y,\alpha]=0$ if $e_{\alpha o\ (i,j)}=0$
$d(i,j)[y,\alpha]=0$ if $\exists \alpha'\neq \alpha$ s.t. $d(i,j)[y,\alpha']\neq 0$
and a natural change is:

$$\sum_{\alpha=1}^{a}\sum_{y=1}^{m_\alpha} d(i,j)[y,\alpha] \geq v_i.$$

Note that, for sufficiently segmented content, $v_i$ can simply be 1. To simplify the discussion below, an assumption can be used that, for every piece of segmented content i, $v_i=1$. This can be generalized to other cases, as discussed below.

Since we do not consider here the placing of content onto storage servers, which has been placed already, we need not consider the term c, which is in effect amortized at this point. Assume currently that there is no additional penalty r, but that the deleterious effect of not satisfying a request is encapsulated in the lack of benefit we accrue. If there are several requests for content, we create one node per request. Similarly, if there are several copies of the content available, then we have one node per available copy.

The weight of an edge can be expressed as:

$\omega((i,j),y_z^\alpha)=\delta_r^\alpha \Im(y_z^\alpha,r,\alpha)$ if $\kappa(y_z^\alpha,\alpha)=i$ and $e_{\alpha,o(i,j)}=1$.

Maximizing the function b is equivalent to solving the maximum weighted matching problem over the graph. In particular, the choice of edges for the matching is equivalent to the choice of the $d(i,j)[y,\alpha]$. The matching constraint is encapsulated in the constraint $d(i,j)[y,\alpha]=0$ if $\exists \alpha'\neq \alpha$ s.t. $d(i,j)[y,\alpha']\neq 0$ In the case where $v_i>1$ does not hold, complicated notation for the ys may be considered, which, in effect, will reduce to decomposing segments into further segments.

The above has reduced the optimization to weighted matching, thus, we may now consider how to implement that weighted matching. Weighted matching is solvable in a graph $G=(V,E)$ polynomial time in $O(|V||E|+|V|^2\log|V|)$.

The fact that several nodes can co-exist on the same physical processor may allow us to reduce the average running time, since two nodes on the same processor need not compete with the same node for a matching.

In order to reduce the running time further, the distributed algorithm can be implemented in a randomized fashion, which further reduce the running time to $O(1)$.

The above-described weights capture the relative benefit of different matches and thus encapsulate relevant information. The information from the access servers that is of importance in the weights can include priority, time constraints (urgency of request), delay of response, bandwidth availability, and any other information, extrinsically provided or intrinsically measured in the network, that is relevant to determine the desirability of a match between a request and the servicing of that request. The information from the storage servers that affects the weight may be load of the server and desirability of the location of the content on the server.

Note that requests may have weights (above-described weight values) that vary with time. For instance, suppose that a request has a desired deadline of T. We use the term, desired deadline, since are no guarantees of service in the system. The purpose of the weight is to make a request rise in priority as its deadline nears. A possible function of the difference of time between the current time t and the deadline T can be $$\frac{1}{a-\lceil t-T\rceil^+},$$

whose value will rise sharply near T for small a and then remain at that high value for values of t near T.

Therefore, the weight of an edge can depends on values assigned to that edge in a time-varying fashion by both endpoints of the edge. A similar approach occurs for ingest of data rather than reads. Note that reads and ingests may be mixed in through their weights. An urgent ingest may thus be given a high weight, which may thus give that ingest priority over a read that is of lower priority. Ingests that are performed in an opportunistic fashion when the system is idle for reads may simply be assigned weights that are lower than those of the reads. Thus, it is not only the relative weights of reads and writes that may determine how they are handled, but the relative priority of reads and writes may also be tuned.

The network arrangement 5 of FIGS. 1-12 has significant implications for network management. For example, it is possible to track quality of service (QOS) in terms of number of requests for content that are satisfied and the speed with which requests are satisfied, possibly in a statistical manner.

For another example, it is possible to query storage servers at certain intervals in order to determine the number of copies of different content segments that they hold. Thus, an inventory can be maintained centrally, rather than a real-time list. Inventories are approximate snapshots, possibly of a composite nature, of the contents of a business. An inventory may be composed of data from different locations, possibly taken at slightly different times. It does not reflect the exact contents of the network storage at any one time, indeed, it may not even be an exact representation of what the state of the network storage was at any time. However, it provides a fair representation of what can be offered to customers and can be updated according to events such as ingest or erasure of content.

Moreover, inventories may allow some discrepancy among themselves. A single inventory or several inventories can be provided in a system, which may be built independently or using each other's content. An inventory may be rebuilt from querying object directories and/or other copies of inventories.

There is interaction between inventories and content management systems. The inventory may be quite minimal, tracking only the number of copies of a piece of content. On the other hand, the inventory may be augmented by information garnered during operation. For example, the inventory may be linked to information about access of pieces of content, such as statistics of requests and deliveries. Such statistics can include information about the origination of request, to aid in the planning of locating content.

Since a detailed centralized view of the contents of all servers along with their locations on those servers is not kept, there may be no need for a global object directory. Storage servers may perform some local re-provisioning, according simply to the requests they view. The computations for such re-provisioning need not necessarily be done locally. Indeed, they may be done where some portion of the network arrangement 5 of FIGS. 1-12 can offload provisioning to be done off-site.

The network arrangement 5 of FIGS. 1-12 can perform some re-provisioning by requesting that servers prioritize or de-prioritize certain segments of content, ingest new or existing segments, or remove certain segments. Addition of new storage servers and of new types of storage does not require careful revision of the current maps. Instead, the network manager of the network arrangement 5 of FIGS. 1-12 can judiciously populate the new storage in a way consistent with optimization approaches.

The network arrangement 5 of FIGS. 1-12 can manage messaging overhead. A simple implementation of a distributed algorithm would give rise to a system in which a request is sent to all storage servers, which would then respond with all of their copies' links. As discussed above, the co-location of copies on a server means that only one offer will be proffered for any one request from an access server. The number of servers is much lower than the number of requests issued in the system. Furthermore, a server may elect not to make an offer in the case where it may be highly loaded. Thus, messaging overhead can be lower. In contrast, when the system has lighter loading, the overhead from the number of messages is of less consequence. If the lack of an offer causes the request not to be satisfied, then that request will be repeated, with a higher weight than previously assigned, since the urgency of the request will have increased.

A server may also decide not to send certain requests if the current backlog of higher weight requests makes the probability that the low weight request will be satisfied too low to justify the effort of assigning it an edge. Such whittling of edges with a low probability of being chosen may dramatically reduce the messaging load in the system. A possible approach is to pick only the top few candidates for edges (top server candidates) to generate a request.

Another, complementary, option is to link requests, for example, for more than one data segment. Such linkage gives more choices than the complete linkage that occurs in an entire object map and allows a trade-off between the flexibility afforded by segmentation and the messaging overhead required for finding a segment of content. For example, if a piece of content does not appear to be locally available and requires a remote server to provide it, it may be reasonable to link the requests of the segments of that piece of content, since it is highly likely that it is available only through the remote server.

While the discussion above has always shown the access servers and the storage servers as being physically separate, such separation need not be necessary. In particular, an access server may be a mere path onto a logical storage server, which may itself be a SAN. Moreover, not all access servers need to be gateways, and we may have internal access servers, which take responsibility for handling requests for downloads or ingest, but do not necessarily have full gateway capabilities.

This approach combines the application specificity of content delivery with the flexibility of a networking protocol that can exist across different physical layers, storage types, and topologies. We mentioned above that the algorithms may make use of a large number of different parameters (within the weights), which, in aggregation, represent the relative benefit of matches between requests and services for those requests over the DAN.

While the performance of the above-described systems and methods depends, in part, on how appropriately they take into account the effect of different parameters within the weights, the ability for the network to operate does not hinge upon perfect tuning.

The redundancy inherent in the network arrangement 5 of FIGS. 1-12 provides resilience not only to outright faults, but also to loose or inappropriate tuning. In this way, the above-described systems and methods have features that are similar to routing algorithms in networks, wherein performance depends on the quality of the weights assigned to different edges, but which operate, in general, with very simple weights, leading to crude but adequate length estimates, such as hop count.

Interaction with conventional load balancers by the network arrangement 5 of FIGS. 1-12 is important for several reasons. First, the presence of the load balancer and its actions can impact the perceived performance of the system. Second, the load balancer is in general an expensive component, and any ability of the network arrangement 5 of FIGS. 1-12 to operate with a simpler, possibly more economical, load balancer than other systems or, even to obviate the need for a load balancer, has a significant impact upon the effective cost of the system.

It should be apparent that load balancing across servers internal to the DAN occurs naturally through the matching of requests with offers. The load balancing is thus of use to manage load balancing across the access servers, which serve as gateways to the DAN.

Requests may be, in the case of streaming applications, of relatively small size. The size will in general depend on the granularity of the segmentation in the system. It may be possible to rely on a relatively simple load balancer, which creates round-robin assignment of requests, in order to have the system work with good load balancing.

Another option is to allow some requests to be balanced automatically among access servers internally in the DAN rather than solely externally. In such a setting, requests may be generated for content (which are satisfied by storage servers) or for assignment of requests. For example, if an access server is unable to satisfy the requests that it is handling, regardless of the storage servers' ability to satisfy these requests, it may post a request to have the request itself handled by a different access server in the above-described hand-off.

Note that this operation is similar to a request for redirect, although it need not necessarily be handled as a redirect if the request can be transparently serviced by the second access server. This may allow not only reduction of load on an access server, which is responsible for delivering the request, but also, in case of pieces of content that are difficult to find in a DAN, where certain storage servers may have no connection to certain access servers, the possibility for those requests to be handled by access servers that may be better suited to satisfy those requests. In this manner, some load balancing may occur in the DAN, not only across storage servers that may be used by access servers, but among access servers themselves by way of hand-offs.

While one may also envision providing similar mechanisms among access servers for content ingest, such redistribution of requests for ingest may impute higher overhead in the system, since they may require transmission of the content for ingest among access servers. Thus, the internal load balancing across access servers is focused on downloads, which are the predominant operations taking place in a DAN.

Furthermore, as previously mentioned in the context of inventories, statistics can be used regarding requests and the manner in which they were satisfied. Such requests may be used to adapt above-described weights with the purpose of creating better load balancing. Such weight adaptation can mean, for example, that better weights can be assigned to storage servers from which matches have not recently been received in order to induce better load distribution. While greater load on a storage server should naturally lead to worse weights being assigned to it, a pre-emptive approach that favors servers that have been relatively idle can avoid loads that lead to declining performance from storage servers. Weights may also be used prescriptively to encourage certain load patterns in systems that may require them, while relying on worsening weights to avoid unacceptable loads from occurring.

If a request (hand-off) is taken by one access server from another access server, it is important that the external originator of the request to the DAN be accessible to the server that takes the request as its own. Thus, it may be necessary to append to a request its point of origination outside the DAN. In certain architectures, it may be that the request must remain with the original access server or a subset of access servers that can establish connectivity. This discussion highlights the gateway role that access servers play in the DAN architecture.

The ability of a DAN to allow hand-off of requests, in effect, melds the functions of load balancing and redirects. A hand-off may occur in cases where an explicit redirect would have been necessary, but also where load balancing would have intervened in a conventional system.

Having described preferred embodiments of the invention it will now become apparent to those of ordinary skill in the art that other embodiments incorporating these concepts may be used. Additionally, the software included as part of the invention may be embodied in a computer program product that includes a computer readable storage medium. For example, such a computer readable storage medium can include a readable memory device, such as a hard drive device, a CD-ROM, a DVD-ROM, a flash memory, or a computer diskette, having computer readable program code segments stored thereon. A computer readable transmission medium can include a communications link, either optical, wired, or wireless, having program code segments carried thereon as digital or analog signals. Accordingly, it is submitted that that the invention should not be limited to the described embodiments but rather should be limited only by the spirit and scope of the appended claims. All publications and references cited herein are expressly incorporated herein by reference in their entirety.

What is claimed is:

1. A device comprising:
a memory; and
a processor to:
send, to a network device, a message requesting access to content via the network device,
the content being available to the network device via a network,
receive, from the network device and based on sending the message, information identifying one or more conditions,
the one or more conditions indicating an ability of the network device to provide the access to the content,
determine that the one or more conditions satisfy one or more criteria associated with the device obtaining the content,
initiate, based on the one or more conditions satisfying the one or more criteria, access to the content via the network device,
obtain the content from the network device based on initiating the access to the content, and
store the accessed content in the memory.

2. The device of claim 1, where the network device is one of a plurality of network devices, and
where the processor is further to:
send the message to the plurality of network devices,
the content being available to the plurality of network devices via at least one network,
receive, from the plurality of network devices and based on sending the message, information identifying respective conditions associated with the plurality of network devices providing the access to the content,
the respective conditions including the one or more conditions, and
select the network device, from the plurality of network devices, based on a comparison of the respective conditions to the one or more criteria.

3. The device of claim 2, where the processor, when sending the message to the plurality of network devices, is further to:
multicast the message to the plurality of network devices.

4. The device of claim 1, where the network device is a first network device,
where the processor, when initiating the access to the content via the network device, is further to:
initiate, based on the information identifying the one or more conditions, access to a first portion of the content via the first network device, and access to a second portion of the content via a second network device that differs from the first network device,
the first portion of the content being different from the second portion of the content, and
where the processor, when obtaining the content, is to:
obtain the first portion of the content via the first network device, and
obtain the second portion of the content via the second network device.

5. The device of claim 1, where the network device is an access server that acquires the content, via the network, from one or more storage servers.

6. The device of claim 1, where the information includes data identifying, as the one or more conditions, at least one of:
an available bandwidth associated with the network device acquiring the content via the network, or
a delay associated with the network device acquiring the content via the network, and
where the one or more criteria include information identifying at least one of:
a bandwidth associated with obtaining the content by the device, or
a maximum delay associated with obtaining the content by the device.

7. The device of claim 1, where the information includes a score associated with the network device acquiring the content via the network,
the score being based on at least one of:
an available bandwidth associated with the network device acquiring the content via the network, or
a delay associated with the network device acquiring the content via the network, and
where the one or more criteria include information identifying at least one of:
a bandwidth associated with obtaining the content by the device, or
a maximum delay associated with obtaining the content by the device.

8. A method comprising:
   receiving, by a device and from a user device, a request for content;
   sending, by a device and based on receiving the request, a message, to a plurality of network devices, requesting access to the content,
      the content being available to the plurality of network devices via at least one network;
   receiving, by the device and from the plurality of network devices, information identifying respective conditions associated with an ability of each network device, of the plurality of network devices, to provide access to the content;
   selecting, by the device, at least one network device, of the plurality of network devices, based on a comparison of the respective conditions to one or more requirements associated with providing the content to the user device;
   initiating, by the device, access to the content via the at least one network device; and
   causing, by the device and based on initiating the access to the content, the content to be provided to the user device.

9. The method of claim 8, where selecting the at least one device includes:
   identifying, based on the information, one or more conditions associated with acquiring the content from each network device of the plurality of network devices; and
   for each network device:
      determining whether the one or more conditions satisfy the one or more requirements; and
      selecting, when the one or more conditions satisfy the one or more requirements, the network device,
         the network device not being selected when the one or more conditions do not satisfy the one or more requirements.

10. The method of claim 8, where sending the message to the plurality of network devices further includes:
    multicasting the message to the plurality of network devices.

11. The method of claim 8, where the at least one network device includes a first network device and a second network device;
    where initiating the access to the content further includes:
       initiating, based on the information identifying the respective conditions, access to a first portion of the content via the first network device and access to a second portion of the content via a second network device that differs from the first network device,
          the first portion of the content being different from the second portion of the content; and
    where causing the content to be provided to the user device includes:
       causing the first portion of the content to be provided to the user device via the first network device, and
       causing the second portion of the content to be provided to the user device via the second network device.

12. The method of claim 8, where the plurality of network devices are access servers.

13. The method of claim 8, where the information includes information identifying one or more of:
    respective available bandwidths associated with the plurality of network devices providing the content, or
    respective delays associated with the plurality of network devices providing the content; and
    where the one or more requirements include one or more of:
       a required bandwidth associated with providing the content to the user device, or
       a maximum delay associated with providing the content to the user device.

14. The method of claim 8, where the information includes respective scores associated with the plurality of network devices providing the content,
    each of the scores being based on at least one of:
       an available bandwidth associated with a respective one of the network devices providing the content, or
       a delay associated with the respective one of the network devices providing the content; and
    where the one or more requirements include one or more of:
       a required bandwidth associated with providing the content to the user device, or
       a maximum delay associated with providing the content to the user device.

15. A non-transitory memory device storing instructions, the instructions comprising:
    one or more instructions that, when executed by a first device, cause the first device to receive, from a second device, a request for access to content,
       the content being available to the first device via a network;
    one or more instructions that, when executed by the first device, cause the first device to determine one or more conditions associated with an ability of the first device to provide the content to the second device;
    one or more instructions that, when executed by the first device, cause the first device to forward, to the second device, an offer identifying the one or more conditions;
    one or more instructions that, when executed by the first device, cause the first device to receive, based on forwarding the offer, an acceptance of the offer;
    one or more instructions that, when executed by the first device, cause the first device to acquire, based on receiving the acceptance, at least a portion of the content via the network; and
    one or more instructions that, when executed by the first device, cause the first device to provide the at least the portion of the content to the second device.

16. The non-transitory memory device of claim 15, where the at least the portion of the content is a first portion of the content, and
    where the second device accesses a second portion of the content via a third device.

17. The non-transitory memory device of claim 15, where the first device and the second devices are access servers.

18. The method non-transitory memory device of claim 15, where the one or more instructions to acquire the at least the portion of the content further include:
    one or more instructions to acquire the at least the portion of the content from one or more storage servers that are remote from the first device and the second device.

19. The non-transitory memory device of claim 15, where the one or more instructions to determine the one or more conditions include:
    one or more instructions to determine at least one of:
       an available bandwidth associated with the first device acquiring the content via the network, or
       a delay associated with the first device acquiring the content via the network.

20. The non-transitory memory device of claim 15, where the instructions further comprise:
    one or more instructions to determine at least one condition associated with forwarding the content from the first device to the second device; and
    one or more instructions to include, in the offer, information identifying the at least one condition.

* * * * *

UNITED STATES PATENT AND TRADEMARK OFFICE
CERTIFICATE OF CORRECTION

| | | |
|---|---|---|
| PATENT NO. | : 8,812,671 B2 | Page 1 of 1 |
| APPLICATION NO. | : 13/727400 | |
| DATED | : August 19, 2014 | |
| INVENTOR(S) | : Muriel Medard et al. | |

It is certified that error appears in the above-identified patent and that said Letters Patent is hereby corrected as shown below:

In the Claims,

Please correct claim 18 as follows:

Column 24, line 45, after "The" delete "method".

Signed and Sealed this
Thirtieth Day of December, 2014

Michelle K. Lee
*Deputy Director of the United States Patent and Trademark Office*